(12) United States Patent
Kim et al.

(10) Patent No.: US 10,075,203 B2
(45) Date of Patent: Sep. 11, 2018

(54) ELECTRONIC DEVICE

(71) Applicant: Samsung Electronics Co., Ltd., Suwon-si, Gyeonggi-do (KR)

(72) Inventors: Gyu-Sub Kim, Suwon-si (KR); Se-Hyun Park, Suwon-si (KR); Ui-Chul Jeong, Anyang-si (KR); Austin Kim, Seongnam-si (KR); Yeon-Woo Kim, Seoul (KR); Joon-Ho Byun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/928,285

(22) Filed: Oct. 30, 2015

(65) Prior Publication Data

US 2016/0142083 A1    May 19, 2016

(30) Foreign Application Priority Data

Nov. 13, 2014    (KR) .................. 10-2014-0157986

(51) Int. Cl.
| | |
|---|---|
| *H01Q 7/00* | (2006.01) |
| *H04B 1/10* | (2006.01) |
| *H01Q 1/24* | (2006.01) |
| *H01Q 9/42* | (2006.01) |
| *H01Q 13/10* | (2006.01) |
| *H01Q 5/364* | (2015.01) |
| *H01Q 5/30* | (2015.01) |
| *H01Q 13/16* | (2006.01) |

(52) U.S. Cl.
CPC .......... *H04B 1/1009* (2013.01); *H01Q 1/243* (2013.01); *H01Q 5/364* (2015.01); *H01Q 7/00* (2013.01); *H01Q 9/42* (2013.01); *H01Q 13/10* (2013.01); *H01Q 5/30* (2015.01); *H01Q 13/16* (2013.01)

(58) Field of Classification Search
CPC ............ H01Q 5/00; H01Q 5/30; H01Q 5/314; H01Q 5/385; H01Q 5/392; H01Q 5/50; H01Q 7/00; H01Q 7/005; H01Q 13/103; H01Q 13/16
USPC .......................... 455/121–125, 553.1, 575.7
See application file for complete search history.

(56) References Cited

U.S. PATENT DOCUMENTS

| | | | | | |
|---|---|---|---|---|---|
| 5,847,682 | A | * | 12/1998 | Ke .......... | H01Q 1/243 343/700 MS |
| 5,940,041 | A | * | 8/1999 | Koyama .......... | H01Q 1/22 343/702 |
| 7,830,327 | B2 | * | 11/2010 | He .......... | H01Q 9/0421 343/828 |
| 8,754,822 | B1 | * | 6/2014 | Dou .......... | H01Q 13/10 343/702 |
| 9,337,539 | B1 | * | 5/2016 | Ananthanarayanan ..................... H01Q 5/335 |

(Continued)

FOREIGN PATENT DOCUMENTS

| | | |
|---|---|---|
| EP | 2 405 534 A1 | 1/2012 |
| KR | 10-2009-0115253 A | 11/2009 |

*Primary Examiner* — Duc M Nguyen
(74) *Attorney, Agent, or Firm* — Jefferson IP Law, LLP

(57) ABSTRACT

An electronic device for communicating in a network is provided. The electronic device includes a circuit board, a frame, a feeding structure formed on the circuit board, and an antenna unit disposed in a plane at a predetermined angle with respect to a surface of the circuit board. In addition, the antenna unit is disposed apart from the frame in electrical connection with the feeding structure.

22 Claims, 14 Drawing Sheets

(56) References Cited

U.S. PATENT DOCUMENTS

| | | | |
|---|---|---|---|
| 2003/0112195 A1* | 6/2003 | Cheng | H01Q 9/42 343/767 |
| 2003/0201943 A1* | 10/2003 | Kadambi | H01Q 1/243 343/702 |
| 2004/0085244 A1 | 5/2004 | Kadambi et al. | |
| 2005/0146475 A1 | 7/2005 | Bettner et al. | |
| 2008/0211722 A1* | 9/2008 | Sanz | H01Q 1/243 343/702 |
| 2009/0079639 A1* | 3/2009 | Hotta | H01Q 1/243 343/702 |
| 2009/0284433 A1* | 11/2009 | Tsutsumi | H01Q 1/243 343/825 |
| 2010/0220016 A1* | 9/2010 | Nissinen | H01Q 1/243 343/702 |
| 2010/0238079 A1* | 9/2010 | Ayatollahi | H01Q 1/243 343/729 |
| 2011/0090128 A1* | 4/2011 | Sulima | H01Q 13/12 343/767 |
| 2011/0163922 A1* | 7/2011 | Wang | H01Q 1/243 343/702 |
| 2011/0183721 A1 | 7/2011 | Hill et al. | |
| 2011/0193759 A1 | 8/2011 | You | |
| 2011/0254744 A1* | 10/2011 | Sumi | H01Q 1/243 343/702 |
| 2012/0013522 A1* | 1/2012 | Yamaguchi | H01Q 9/16 343/893 |
| 2012/0077448 A1* | 3/2012 | Yagi | H01Q 1/243 455/90.2 |
| 2012/0115336 A1* | 5/2012 | Kanazawa | H01Q 1/243 439/32 |
| 2012/0256802 A1* | 10/2012 | Wong | H01Q 1/2266 343/771 |
| 2012/0305656 A1* | 12/2012 | Brown | G01V 15/00 235/492 |
| 2013/0050038 A1 | 2/2013 | Eom et al. | |
| 2013/0127674 A1* | 5/2013 | Korva | H01Q 1/243 343/702 |
| 2013/0154897 A1 | 6/2013 | Sorensen et al. | |
| 2013/0187818 A1* | 7/2013 | Desclos | H01Q 13/10 343/770 |
| 2013/0316662 A1* | 11/2013 | Bengtsson | H04B 7/0874 455/77 |
| 2013/0342411 A1 | 12/2013 | Jung et al. | |
| 2014/0015723 A1* | 1/2014 | Cho | H01Q 13/103 343/750 |
| 2014/0062796 A1* | 3/2014 | Chen | H01Q 1/243 343/700 MS |
| 2014/0098000 A1 | 4/2014 | Ali et al. | |
| 2014/0232612 A1* | 8/2014 | Jenwatanavet | H01Q 1/521 343/893 |
| 2014/0266945 A1* | 9/2014 | Dou | H01Q 13/10 343/770 |
| 2014/0329570 A1* | 11/2014 | Lin | H04M 1/0277 455/575.7 |

\* cited by examiner

ELECTRONIC DEVICE

CROSS-REFERENCE TO RELATED APPLICATION(S)

This application claims the benefit under 35 U.S.C. § 119(a) of a Korean patent application filed on Nov. 13, 2014 in the Korean Intellectual Property Office and assigned Serial number 10-2014-0157986, the entire disclosure of which is hereby incorporated by reference.

TECHNICAL FIELD

The present disclosure relates to an electronic device and in particularly an antenna device used in an electronic device.

BACKGROUND

In general, an electronic device is a device that executes a specific function according to a program loaded in the device, such as a home appliance, an electronic notepad, a portable multimedia player (PMP), a mobile communication terminal, a tablet personal computer (PC), a video/audio player, a desktop/laptop computer, and an in-vehicle navigator. These electronic devices can output stored information visually and/or audibly. As the integration level of electronic devices has increased and ultra high-speed, large-capacity wireless communication has become popular, a single mobile communication terminal may be configured to perform various different functions. For example, an electronic device may include one or more of an entertainment function such as gaming, a multimedia function such as music/video play, a communication and security function such as mobile banking, a scheduling or calendar function, and an electronic wallet function as well as a communication function. As the multimedia service or the entertainment function capabilities have advanced for an electronic device such as a mobile communication terminal, users tend to prefer an electronic device which is portable but has a sufficient-size display.

To enable wireless communication, an electronic device needs an antenna device in order to transmit and/or receive signals. The antenna device may be separated from other circuits by a sufficient distance to suppress undesired interference with the other circuits during transmission and reception of radio frequency (RF) signals.

Most of recent terminals are configured to accommodate two or more frequency bands. For example, mobile communication terminals conforming to 3rd generation partnership project (3GPP) long term evolution (LTE) which is a major worldwide standard for 4th generation (4G) mobile communication should mostly support 700 to 960 MHz and 2.5 to 2.7 GHz.

Although the trend in design is to reduce the size of electronic devices, an antenna having excellent radiation performance and a wide bandwidth is desired despite the reduction in size of the electronic device. Particularly, an antenna area at the top and bottom of the electronic device in which a built-in antenna is mounted has become smaller. Accordingly, to achieve excellent radiation performance without changing an overall antenna device size is a big issue in antenna design.

Conventionally, a housing or case of an electronic device is fabricated by insertion molding. An area for mounting an antenna device is defined at the top and bottom ends of the case and a display is provided at the center of the case. The molded case is vulnerable to an impact which may result in undesirable damage to the display. Therefore, a frame may be provided around the display.

However, the use of the frame to mitigate undesirable damage to the display may undesirably affect the radiation performance of the antenna device.

For example, the frame may reduce radiation performance of the antenna device.

To overcome the shortcomings, mutual interference may be reduced by placing the frame of the display as far as possible from the antenna device. However, it is difficult to secure a sufficient distance between the frame and the antenna device within a limited space of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device having a frame and a circuit board in which a predetermined distance is secured between the frame and an antenna device by placing an antenna unit in a plane different from the surface of the circuit board so as to reduce mutual interference between the frame and the antenna device and thus prevent degradation of the radiation performance of the antenna device.

Another aspect of the present disclosure is to provide an electronic device in which a plurality of antenna units are arranged substantially perpendicular in a plane different from the surface of a circuit board so as to support multiple bands and a wideband through the antenna units.

In accordance with an aspect of the present disclosure, an electronic device is provided. The electronic device includes a circuit board, a frame, a feeding structure formed on the circuit board, and an antenna unit disposed in a plane at a predetermined angle with respect to a surface of the circuit board. The antenna unit is disposed apart from the frame in electrical connection to the feeding structure.

In accordance with another aspect of the present disclosure, an electronic device is provided. The electronic device includes a circuit board, a frame, a first antenna unit disposed in a plane at a predetermined angle with respect to a surface of the circuit board, a second antenna unit disposed apart from the first antenna unit on the circuit board in a plane at a predetermined angle with respect to the surface of the circuit board, a third antenna unit disposed between the first and second antenna units in a plane at a predetermined angle with respect to the surface of the circuit board, and a feeding structure formed on the circuit board. The feeding structure electrically connects the first, second, and third antenna units to the circuit board.

In accordance with another aspect of the present disclosure, an electronic device is provided. The electronic device includes a circuit board, a frame, a feeding structure formed on the circuit board, and an antenna unit disposed apart from the frame in a plane at a predetermined angle with respect to a surface of the circuit board and electrically connected to the feeding structure. A variable antenna device is disposed in the antenna unit to electrically connect a first point of the antenna unit to a second point of the antenna unit to change an antenna frequency.

In accordance with another aspect of the present disclosure, an electronic device is provided. The electronic device includes a circuit board, a frame, a first antenna unit disposed at one end of the frame in a plane at a predetermined angle with respect to a surface of the circuit board, a second antenna unit disposed apart from the first antenna unit on the circuit board in a plane at a predetermined angle with respect to the surface of the circuit board, a third antenna unit disposed between the first and second antenna units in a plane at a predetermined angle with respect to the surface of the circuit board, and a feeding structure formed on the circuit board. The feeding structure electrically connects the first, second, and third antenna units to the circuit board. A variable antenna device is disposed among the first, second, and third antenna units to electrically connect one point of the antenna units to another point of the antenna units to change an antenna frequency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
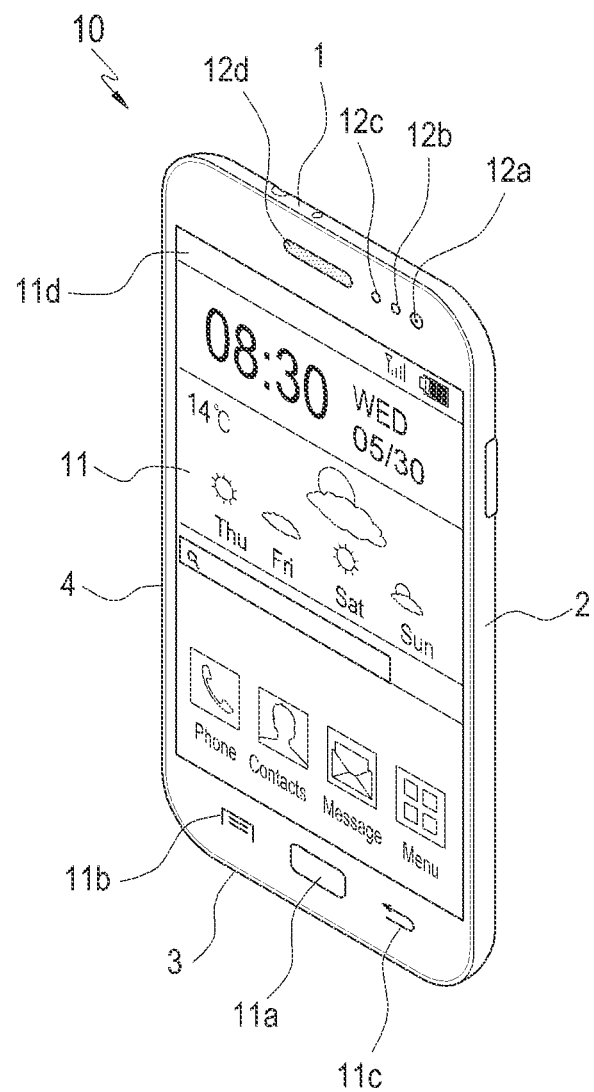
FIG. 1 is a perspective view illustrating the front surface of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure will be described below. According to an embodiment of the present disclosure, an electronic device may be at least one of, for example, a mobile communication terminal operating in compliance with a communication protocol corresponding to any of various communication systems, an information communication device, a multimedia device, and an application of them, such as a video phone, an e-book reader, a laptop personal computer (PC), a Netbook computer, a personal digital assistant (PDA), a portable multimedia player (PMP), an MPEG-1 audio layer-3 (MP3) player, a mobile medical equipment, a camera, and a wearable device (for example, a head-mounted device (HMD) such as electronic glasses, electronic clothes, an electronic bracelet, an electronic necklace, an electronic appcessory, an electronic tattoo, or a smart watch).

According to some embodiments, an electronic device may be a smart home appliance. For example, the smart home appliance may be at least one of a television (TV), a digital versatile disk (DVD) player, an audio player, a refrigerator, an air conditioner, a vacuum cleaner, an oven, a micro oven, a washer, an air purifier, a set-top box, a TV box (for example, SAMSUNG HOMESYNC, APPLE TV, GOOGLE TV, or the like), a game console, an electronic dictionary, an electronic key, a camcorder, and an electronic picture frame.

According to various embodiments of the present disclosure, an electronic device may be at least one of a medical device (for example, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, and the like.

According to various embodiments of the present disclosure, an electronic device may be at least one of furniture, part of a building/structure, an electronic board, an electronic signature receiving device, a projector, and various measuring devices (for example, water, electricity, gas or electro-magnetic wave measuring devices), which include communication functionality.

An electronic device according to various embodiments of the present disclosure may be one or a combination of two or more of the foregoing devices. Also, an electronic device according to various embodiments of the present disclosure may be a flexible device. In addition, it will be apparent to one having ordinary skill in the art that an electronic device according to the present disclosure is not limited to the foregoing devices.

Figure 2:
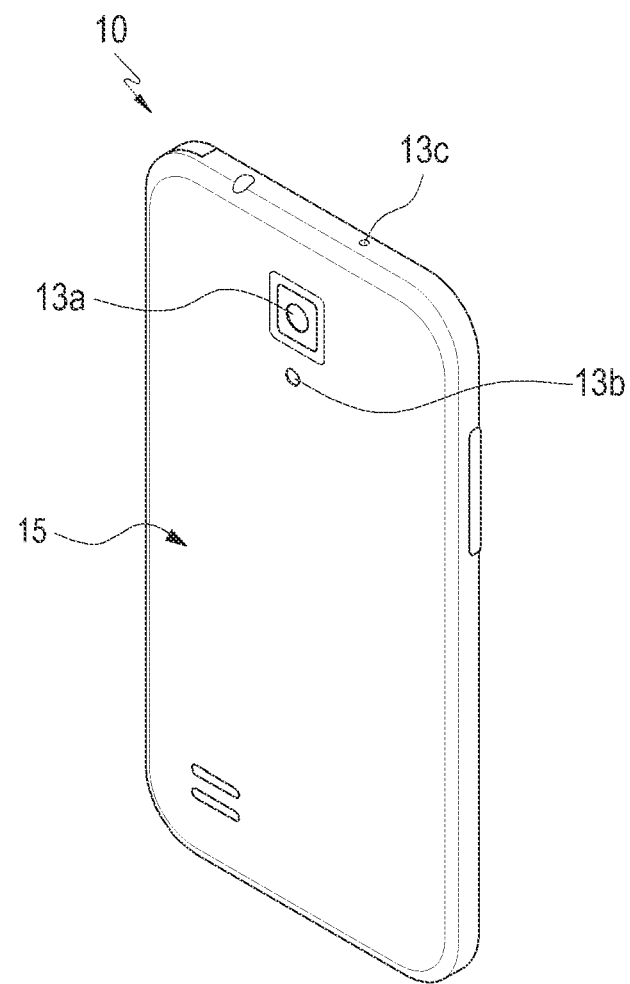
FIG. 2 is a perspective view illustrating the rear surface of the electronic device according to various embodiments of the present disclosure.

FIG. 1 is a perspective view illustrating the front surface of an electronic device and FIG. 2 is a perspective view illustrating the rear surface of the electronic device according to various embodiments of the present disclosure. The electronic device may be a smart phone or a tablet PC. With reference to FIGS. 1 and 2, the structure of an electronic device such as a smart phone will be described below.

Referring to FIG. 1, a touch screen 11 may be disposed at the center of the front surface of an electronic device 10. The touch screen 11 may occupy the entirety of the front surface of the electronic device 10. In the example of FIG. 1, a main home screen is displayed on the touch screen 11. The main home screen is the first screen displayed on the touch screen 11 when the electronic device 10 is powered on. If the electronic device 10 has different home screens on a plurality of pages, the main home screen may be the first of the home screens on the plurality of pages. Short icons for executing frequently used applications, a main menu switch key, time, weather, and the like may be displayed on a home screen. The main menu switch key may be used to display a menu screen on the touch screen 11. A status bar 11d indicating states such as a battery charged state, a received signal strength, and a current time may be formed at the top of the touch screen 11. A home key 11a, a menu button 11b, and a back button 11c may be formed at the bottom of the touch screen 11.

The home key 11a may be used to display the main home screen on the touch screen 11. For example, when the home button 11a is touched with a home screen other than the main home screen or a menu screen displayed on the touch screen 11, the main home screen may be displayed on the touch screen 11. When the home key 11a is touched during execution of an application on the touch screen 11, the main home screen may be displayed on the touch screen 11. Further, the home key 11a may be used to display a recently used application or a task manager on the touch screen 11. The menu button 11b may provide link menus available on the touch screen 11. The link menus may include a widget add menu, a background screen change menu, a search menu, an edit menu, and an environment setting menu. The back button 11c may be used to display a screen executed previously to an on-going screen or end the most recently used application.

According to various embodiments of the present disclosure, a first camera 12a, an illumination sensor 12b, a proximity sensor 12c, or a speaker 12d may be included in an upper end area of the front surface of the electronic device 10. Referring to FIG. 2, a second camera 13a, a flash 13b, or a speaker 13c may be included on the rear surface of the electronic device 10. If a battery pack is detachably attached to the electronic device 10, the rear surface of the electronic device 10 may be a detachable battery cover 15.

An electronic device which will be described hereinbelow may be any of the afore-described laptop computer, Netbook computer, smart phone, tablet PC, GALAXY TAB, and IPAD.

Further, a frame 1, 2, 3, 4 may be provided around the touch screen 11 to prevent impact-caused breakage of the corners of the touch screen 11.

Figure 3:
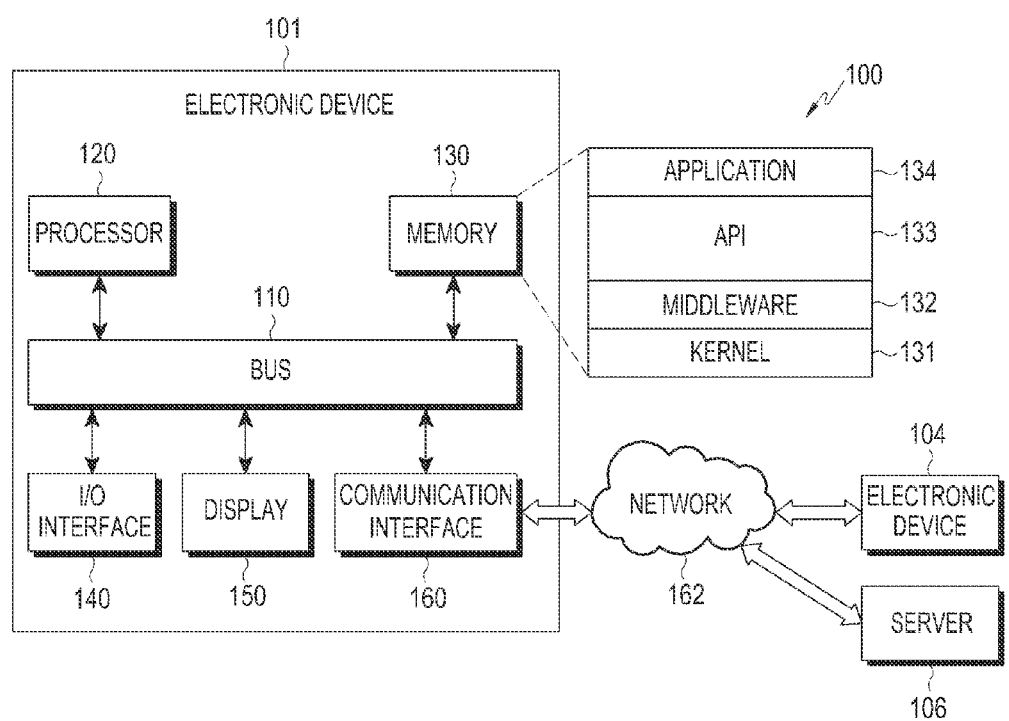
FIG. 3 is a block diagram of a network environment including an electronic device according to various embodiments of the present disclosure.

FIG. 3 is a block diagram of a network environment including an electronic device according to various embodiments of the present disclosure.

Referring to FIG. 3, the electronic device 101 may include a bus 110, a processor 120, a memory 130, an input/output (I/O) interface 140, a display 150, and a communication interface 160. The bus 110 may be a circuit that connects the foregoing components and allows communication (for example, control messages) between the foregoing components.

The processor 120 may, for example, receive instructions from other components (for example, the memory 130, the I/O interface 140, the display 150, or the communication interface 160), interpret the received instructions, and execute computation or data processing according to the interpreted instructions.

The memory 130 may, for example, store instructions or data that are received from, or generated by, other components (for example, the I/O interface 140, the display 150, or the communication interface 160). For example, the memory 130 may include programming modules such as a kernel 131, middleware 132, an application programming interface (API) 133, or an application 134. Each of the foregoing programming modules may include software, firmware, hardware, or a combination of at least two of software, firmware, and hardware.

The kernel 131 may control or manage system resources (for example, the bus 110, the processor 120, or the memory 130) that are used in executing operations or functions implemented in other programming modules such as the middleware 132, the API 133, or the application 134. Also, the kernel 131 may provide an interface for allowing the middleware 132, the API 133, or the application 134 to access and control or manage individual components of the electronic device 101.

The middleware 132 may be a medium through which the kernel 131 may communicate with the API 133 or the application 134 to transmit and receive data. Also, the middleware 132 may perform control operations (for example, scheduling or load balancing) in regard to work requests by one or more applications 134 by, for example, assigning priorities for using system resources (the bus 110, the processor 120, or the memory 130) of the electronic device 101 to the one or more applications 134.

The API 133 is an interface that may control functions that the application 134 provides at the kernel 131 or the middleware 132. For example, the API 133 may include at least one interface or function (for example, a command) for file control, window control, video processing, or text control.

According to various embodiments of the present disclosure, the application 134 may include a short message service (SMS)/multimedia messaging service (MMS) application, an email application, a calendar application, an alarm application, a health care application (for example, an application that measures the amount of exercise or a blood sugar level), or an environment information application (for example, an application that provides information about air pressure, humidity, or temperature). Alternatively or additionally, the application 134 may be related to information exchange between the electronic device 101 and an external electronic device (for example, an electronic device 104). The information exchange-related application may be, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 104). Alternatively or additionally, the notification relay application may receive notification information from the external electronic device (for example, the electronic device 104) and provide the received notification information to a user. The device management application may manage (for example, install, delete, or update) at least a part of the functions of the external electronic device (for example, the electronic device 104) communicating with the electronic device 101 (for example, turn-on/turn-off of the external electronic device (or a part of its components) or control of the brightness (or resolution) of the display), an application executed in the external electronic device, or a service (for example, a call service or a message service) provided by the external electronic device.

According to various embodiments of the present disclosure, the application 134 may include an application designated according to a property (for example, the type of the electronic device) of the external electronic device (for example, the electronic device 104). For example, if the external electronic device is an MP3 player, the application 134 may include an application related to music play. If the external electronic device is a mobile medical device, the application 134 may include an application related to health care. According to an embodiment, the application 134 may include at least one of an application designated in the electronic device 101 or an application received from another electronic device (for example, a server 106 or the electronic device 104).

The I/O interface 140 may receive a command or data from a user through an I/O device (for example, a sensor, a keyboard, or a touch screen) to the processor 120, the memory 130, or the communication interface 160, for example, through the bus 110. For example, the I/O interface 140 may provide data of a user touch received through the touch screen to the processor 120. Further, the I/O interface 140 may, for example, output a command or data received from the processor 120, the memory 130, or the communication interface 160 through the bus 110 to the I/O device (for example, a speaker or a display). The I/O interface 140 may include an audio module.

The display 150 may display various types of information (for example, multimedia data or text data) to the user.

The communication interface 160 may provide communication between the electronic device 101 and an external device (for example, the electronic device 104 or the server 106). For example, the communication interface 160 may be connected to a network 162 by wireless or wired communication and communicate with the external device over the network 162. The wireless communication may be conducted in conformance to, for example, at least one of WiFi, bluetooth (BT), near field communication (NFC), global positioning system (GPS), and cellular communication (for example, long term evolution (LTE), LTE-advanced (LTE-A), code division multiple access (CDMA), Wideband CDMA (WCDMA), universal mobile telecommunication system (UMTS), wireless broadband (WiBro), or global system for mobile communications (GSM)). The wired communication may be conducted in conformance to, for example, at least one of universal serial bus (USB), high definition multimedia interface (HDMI), recommended standard 232 (RS-232), or plain old telephone service (POTS).

According to an embodiment, the network 162 may be a communication network, for example, at least one of a computer network, the Internet, an Internet of things (IoT), and a telephone network. According to an embodiment, at least one of the application 134, the API 133, the middleware 132, the kernel 131, and the communication interface 160 may support a protocol (for example, a transport layer protocol, a data link layer protocol, or a physical layer protocol) for communication between the electronic device 101 and an external device.

According to various embodiments of the present disclosure, a controller may include the processor 120 and the memory 130 for storing information requested by the processor 120. The controller is a central processing unit (CPU) and provides overall control to the electronic device 101. According to an embodiment of the present disclosure, the controller may be configured to perform an operation to supply power to an antenna device for wireless communication, as described later.

Further, the antenna device is provided in the electronic device to transmit and receive radio signals and process the radio signals. Interference with other circuit devices may be suppressed during transmission and reception of radio signals by installing the antenna device within the electronic device such that a sufficient distance separates the antenna device from the circuit devices. For example, an electronic device conforming to a 4G mobile communication standard such as LTE is connected to commercial communication networks in various frequency bands. The antenna device may include a plurality of antenna units according to the number of frequency bands such that the single electronic device may communicate over the various frequency bands using the plurality of antenna units.

According to various embodiments of the present disclosure, the antenna device may include a slot antenna to increase the radiation performance of the antenna unit. The following description is given with the appreciation that the radiation performance of an antenna unit means the transmission and reception capability of the antenna device. That is, the radiation performance refers to the capability of receiving signals from other terminals with minimal loss and the capability of transmitting an intended signal in the air with minimal loss at the antenna device.

While the antenna device according to various embodiments of the present disclosure is described as a slot antenna, this does not limit the present disclosure. For example, various devices are available as the antenna device, as far as the devices transmit and receive radio signals.

Figure 4:
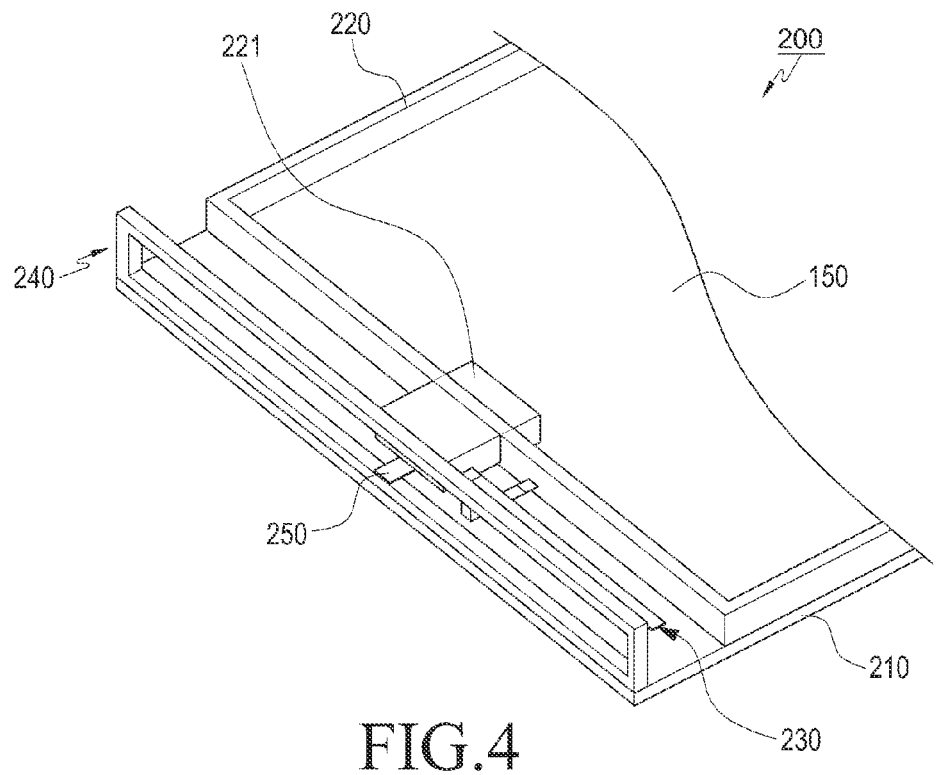
FIG. 4 is a perspective view of an antenna device in an electronic device according to various embodiments of the present disclosure.

FIG. 4 is a perspective view of an antenna device in an electronic device according to various embodiments of the present disclosure.

Referring to FIG. 4, an antenna device 200 includes a circuit board 210, a frame 220, a feeding structure 230, and an antenna unit 240. The circuit board 210 is provided inside the electronic device (e.g., electronic device 10 in FIG. 1) to be electrically connected to the antenna unit 240 through the later-described feeding structure 230. The frame 220 is provided on the circuit board 210 in the electronic device (e.g., electronic device 10 in FIG. 1), surrounding the display (e.g., display 150 in FIG. 3) of the electronic device (e.g., electronic device 10 in FIG. 1). Further, the frame 200 may be provided on a front case (not shown) and a rear case (not shown) of the electronic device. In an exemplary embodiment, components of the electronic device 10 may be disposed on the circuit board 210 within the frame 220.

The feeding structure 230 may be configured to electrically couple the antenna unit 240 with the circuit board 210. In an exemplary embodiment, the feeding structure 230 may directly or indirectly couple the antenna unit 240 with the circuit board 210. For example, when the feeding structure 230 directly couples the antenna unit 240 with the circuit board 210, the feeding structure 230 contacts both the antenna unit 240 and the circuit board 210. When the feeding structure 230 indirectly couples the antenna unit 240 with the circuit board, one end of the feeding structure 230 may contact the circuit board 210 and the other end of the feeding structure does not contact the antenna unit 240.

Antenna unit 240 is configured to transmit and receive radio frequency signals within a communication network. Antenna unit 240 may be any type of antenna. For example, antenna unit 240 may be a slot antenna, a loop antenna, a Planar Inverted-F Antenna (PIFA), etc. In an exemplary embodiment, a portion of antenna unit 240 may be completely or partially integrated with frame 220.

The antenna unit 240 may be disposed on the circuit board 210 such that the antenna unit 240 is spaced apart from the frame 220. Antenna unit 240 may be disposed within the electronic device 10 in various arrangements. For example, antenna unit 240 may be disposed at different angles with respect to the circuit board 210. In an exemplary embodiment, the antenna unit 240 may be arranged at a predetermined angle with respect to the surface of the circuit board 210 such that at least a portion of the antenna unit 240 is in a plane different from the plane associated with the surface of the circuit board 210. For example, as illustrated in FIG. 4, antenna unit 240 may be arranged to be substantially perpendicular to a surface of the circuit board 210.

The frame 220 is configured to provide structural support within electronic device 10. Frame 220 may be any type of frame. For example, frame 220 may be a liquid crystal display (LCD) frame, a touch screen frame, a keypad frame, etc. Frame 220 may be manufactured using various materials where frame 220 may include one type of material or a combination of various types of materials. In an exemplary embodiment, frame 220 is a metal frame.

In an exemplary embodiment, a display, such as display 150, may be provided within frame 220. Display 150 may include at least one of a LCD, a light emitting diode (LED), a touch screen, and a touch panel. In addition, any other display unit may be applied to the display 150.

A ground shorting pin 250 is configured to ground the antenna unit 240 and/or the frame 220. For example, ground shorting pin 250 may be coupled between the frame 220 and the antenna unit 240 to electrically connect a ground surface of the frame 220 to a ground surface of the antenna unit 240. In an exemplary embodiment, the ground shorting pin 250 may be provided at a connector 221 of the frame 220 such that the ground surface of the frame 220 and the ground surface of the antenna unit 240 are electrically connected.

In an exemplary embodiment, mutual interference between the frame 220 and the antenna unit 240 and degradation of radiation performance of the antenna device 200 may be reduced when antenna unit 240 is disposed such that antenna unit 240 is spaced apart from the frame 220 and oriented substantially perpendicular to a surface of the circuit board 210.

Figure 5:
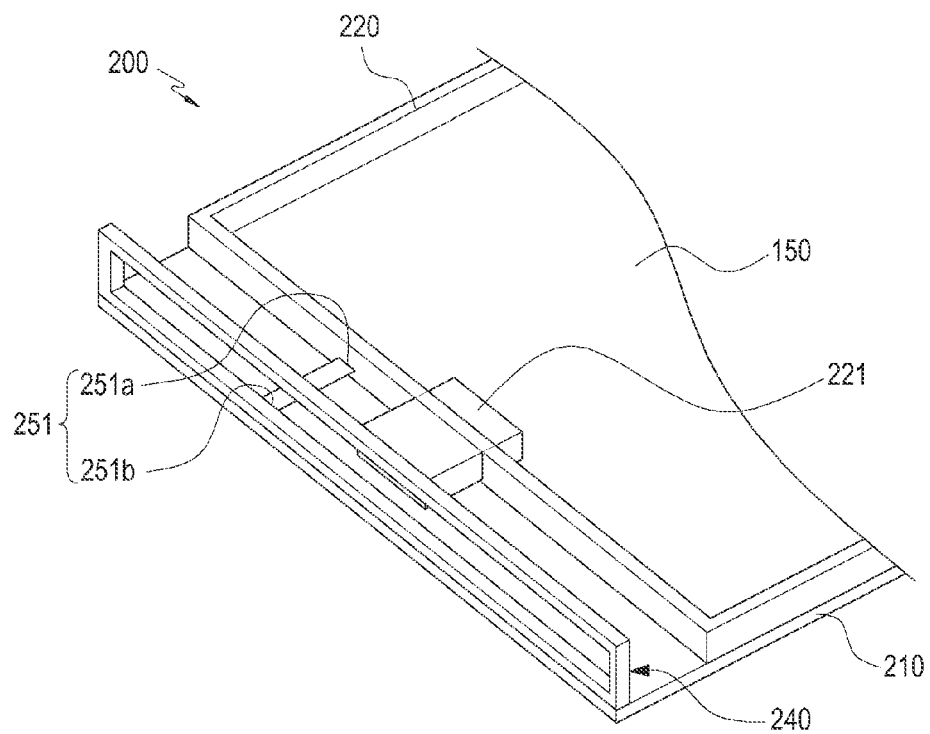
FIG. 5 is a perspective view of an antenna device of an electronic device according to various embodiments of the present disclosure.
Figure 6:
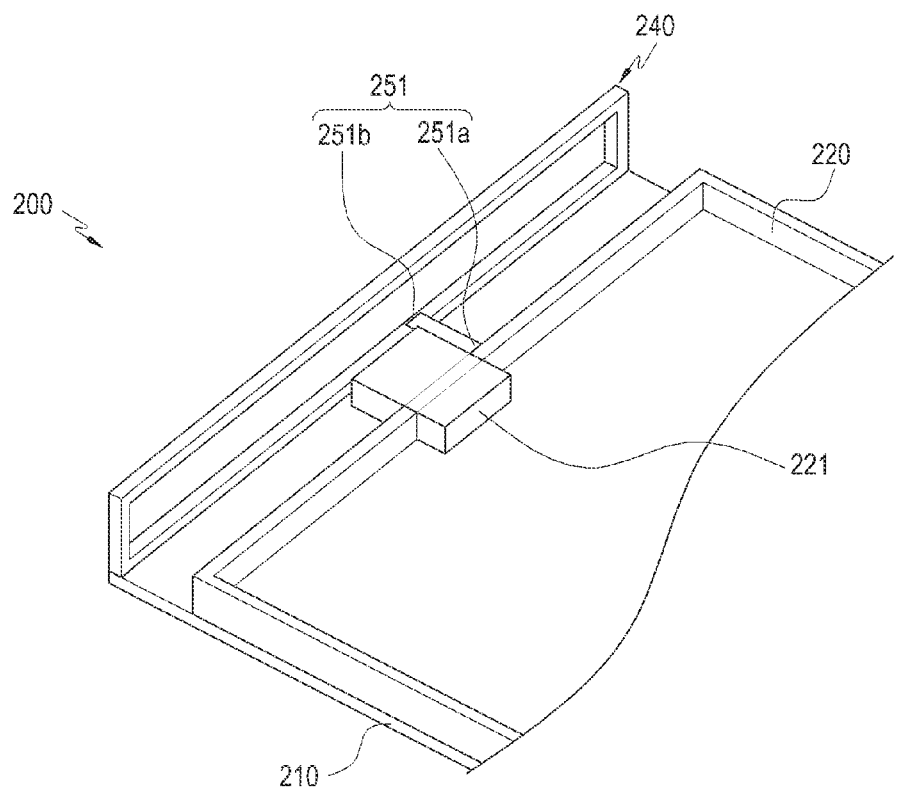
FIG. 6 is a perspective view of the antenna device of an electronic device illustrated in FIG. 5.

FIGS. 5 and 6 illustrate an antenna device of an electronic device according to an embodiment of the present disclosure.

For example, FIG. 5 is a perspective view an antenna device 200 of an electronic device according to another embodiment of the present disclosure and FIG. 6 is a perspective view illustrating the antenna device 200 of the electronic device illustrated in FIG. 5.

Referring to FIGS. 5 and 6, a first end 251*a* of the ground shorting pin 251 may be electrically connected to the frame 220 and a second end 251*b* of the ground shorting pin 251 may be electrically connected to the antenna unit 240. In an exemplary embodiment, the ground shorting pin 251 is provided between the frame 220 and the antenna unit 240 such that the first end 251*a* of the ground shorting pin 251 is directly coupled to the frame 220 and the second end 251*b* of the ground shorting pin 251 is directly coupled to the antenna unit 240.

In contrast to the ground shorting pin 250 illustrated in FIG. 4, the ground shorting pin illustrated in FIGS. 5 and 6 is spaced away from connector 221 of the frame 220 where the first end 251*a* of the ground shorting pin 251 is directly coupled to the frame 220 rather than the connector 221 of the frame 220 as illustrated in FIG. 4.

It is noted that for clarity and ease of illustration, a feeding structure is omitted from FIGS. 5 and 6. However, one of ordinary skill in the art would recognize that any feeding structure may be implemented in the antenna device 200 illustrated in FIGS. 5 and 6. For example, a direct feeding structure (e.g., feeding structure 232 as illustrated in FIGS. 9-12) or an indirect feeding structure (e.g., feeding structure 231 as illustrated in FIGS. 4, 7, and 8) may be included in the antenna device 200 illustrated in FIGS. 5 and 6.

Figure 7:
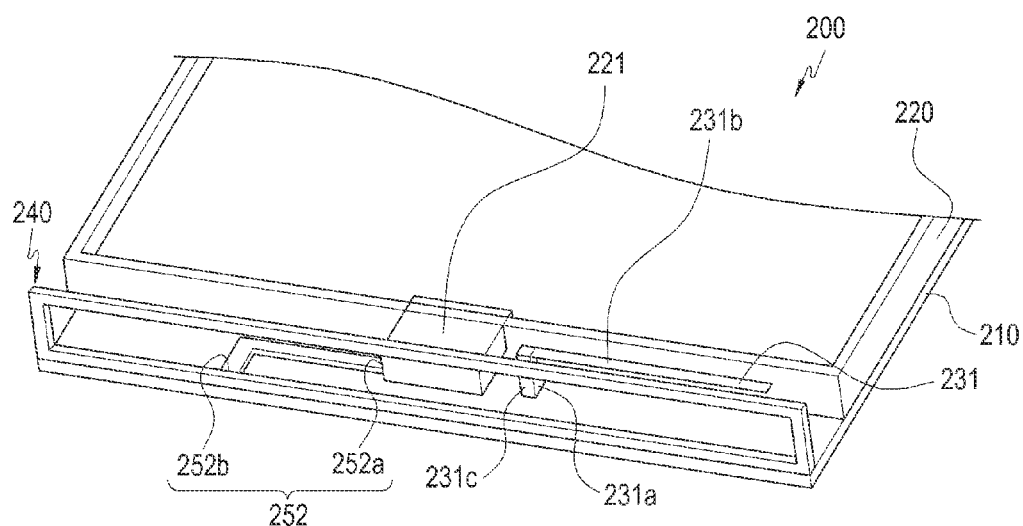
FIG. 7 is a perspective view of an antenna device of an electronic device according to various embodiments of the present disclosure.
Figure 8:
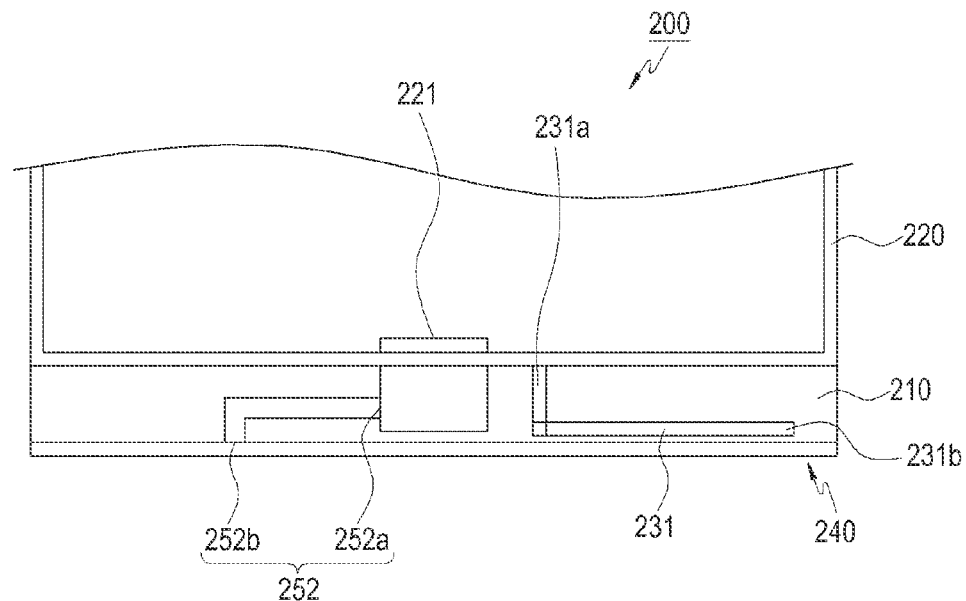
FIG. 8 is a plan view of the antenna device of the electronic device illustrated in FIG. 7.

FIGS. 7 and 8 illustrate an antenna device according to an embodiment of the present disclosure.

For example, FIG. 7 is a perspective view of an antenna device 200 of an electronic device according to another embodiment of the present disclosure and FIG. 8 is a plan view of the antenna device 200.

Referring to FIGS. 7 and 8, a first end 252*a* of the ground shorting pin 252 may be electrically connected to a side surface of the connector 221 of the frame 220 and a second end 252*b* of the ground shorting pin 252 electrically connected to the antenna unit 240. In an exemplary embodiment, the ground shorting pin 252 is configured to include a bend such that the second end 252*b* of the ground shorting pin 252 is substantially perpendicular to the antenna unit 240 and the first end 252*a* of the ground shorting pin 252 is substantially parallel to the antenna unit 240.

In contrast to the ground shorting pin 251 illustrated in FIGS. 5 and 6, the first end 252*a* of the ground shorting pin 252 is not electrically connected to a front surface of the frame 220. Rather, the first end 252*a* of ground shorting pin 252 is directly coupled to a side surface of the connector 221 and the second end 252*a* of the ground shorting pin 252 is directly coupled the antenna unit 240 such that the ground shorting pin 252 is configured to include a bend where the second end 252*b* of the ground shorting pin 252 is substantially perpendicular to the antenna unit 240 and the first end 252*a* of the ground shorting pin 252 is substantially parallel to the antenna unit 240. While ground shorting pin 252 is illustrated as having a particular shape, one of ordinary skill in the art would recognize that the ground shorting pin 252 may have any size, shape, or configuration such that the ground shorting pin 252 electrically connects the antenna unit 240 with the connector 221 to reduce undesired interference and degradation of radiation performance of the antenna unit.

Referring to FIGS. 7 and 8, antenna device 200 includes feeding structure 231. Feeding structure 231 is an indirect feeding structure where feeding structure 231 is electrically connected between the circuit board 210 and the antenna unit 240. For example, a first end 231*a* of the feeding structure 231 is directly coupled to the circuit board 210 and the second end 231*b* of the feeding structure 231 is spaced away from antenna unit 240. In addition, feeding structure 231 may include a portion 231*c* that extends between the first end 231*a* and the second end 231*b* of the feeding structure 231 such that the first end 231*a* extends substantially perpendicular from the frame 220, the second end 231*b* extends substantially parallel to the antenna unit 240, and the portion 231*c* is coupled between the first end 231*a* and the second end 231*b*.

Figure 9:
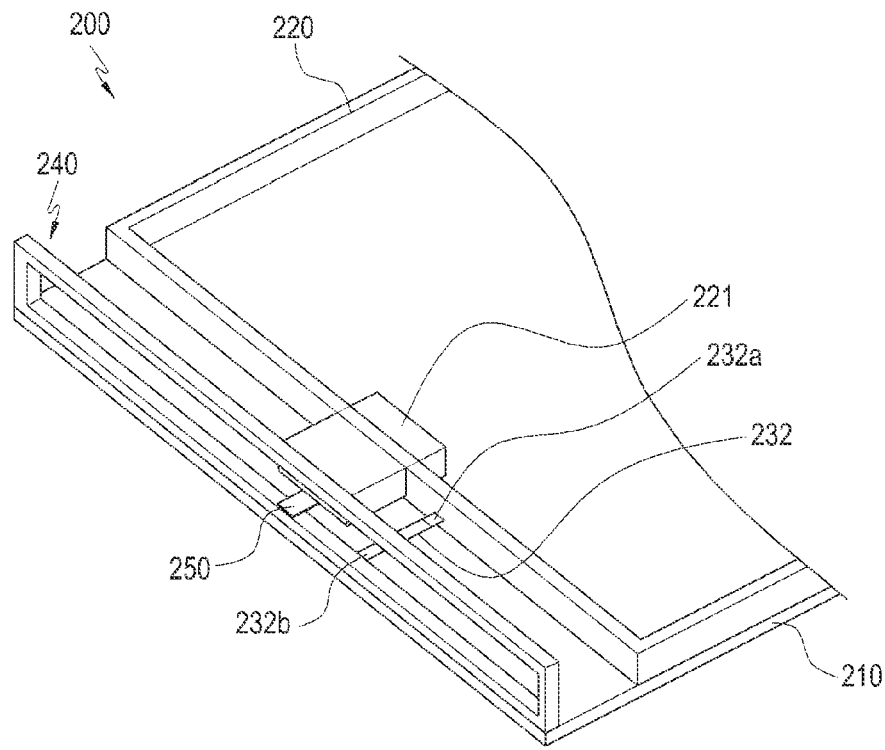
FIG. 9 is a perspective view of an antenna device of an electronic device according to various embodiments of the present disclosure.

FIG. 9 is a perspective view of an antenna device according to an embodiment of the present disclosure.

Referring to FIG. 9, in contrast to the feeding structure 231 illustrated in FIGS. 7 and 8, feeding structure 232 illustrated in FIG. 9 is a direct feeding structure that electrically connects the circuit board 210 and the antenna unit 240. In an exemplary embodiment, a first end 232*a* of the feeding structure 232 is directly coupled to the circuit board 210 and a second end 232*b* of the feeding structure 232 is directly coupled to the antenna unit 240.

Referring to FIG. 9, the antenna device 200 includes a ground shorting pin 250 provided at the connector 221 of the frame 220. Specifically, the ground shorting pin 250 electrically couples the ground surface of the frame 220 and the ground surface of the antenna unit 240 through the connector 221.

Figure 10:
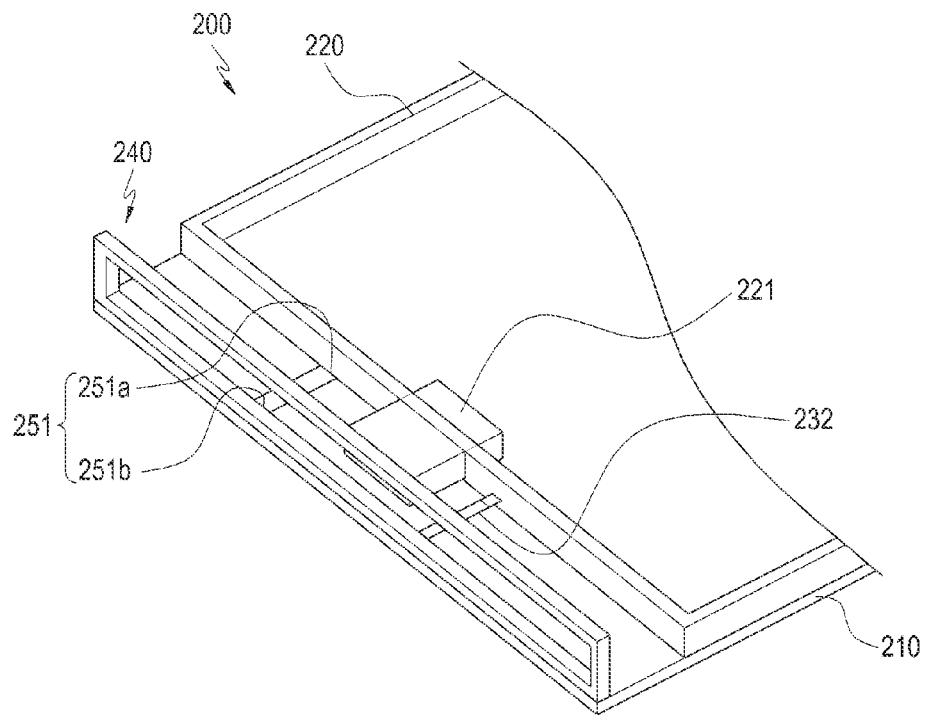
FIG. 10 is a perspective view of an antenna device of an electronic device according to various embodiments of the present disclosure.

FIG. 10 is a perspective view of an antenna device of an electronic device according to an embodiment of the present disclosure.

Referring to FIG. 10, the antenna device 200 includes the feeding structure 232 and the ground shorting pin 251. For example, feeding structure 232 is a direct feeding structure that electrically connects the circuit board 210 directly to the antenna unit 240. In addition, the ground shorting pin 251 is spaced apart from connector 221 and directly connected between the frame 220 and the antenna unit 240. In an exemplary embodiment, a first end 251*a* of the ground shorting pin 251 is directly coupled to the frame 220 and a second end 251*b* of the ground shorting pin 251 is directly coupled to the antenna unit 240.

In other words, the ground shorting pin 251 is not electrically connected to the antenna unit 240 through the connector 221 of the frame 220. Rather, the ground shorting pin 251 electrically connects the frame 220 directly to the antenna unit 240.

Figure 11:
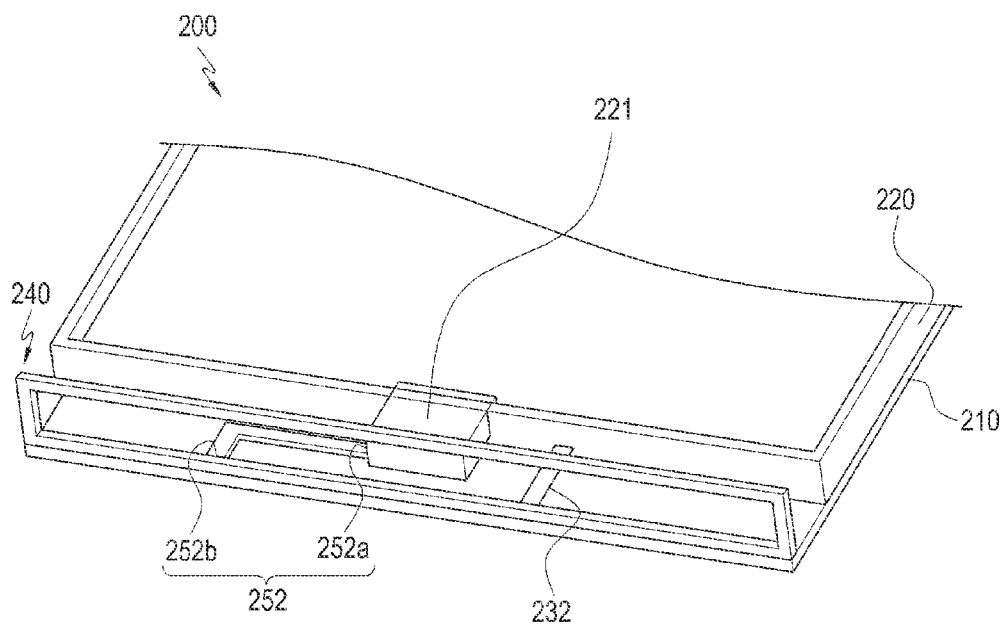
FIG. 11 is a perspective view of an antenna device of an electronic device according to various embodiments of the present disclosure.
Figure 12:
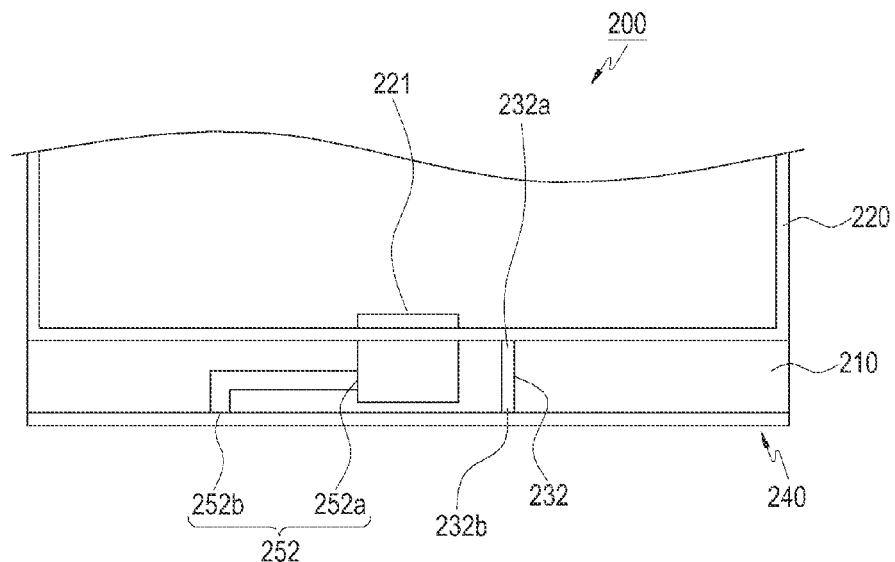
FIG. 12 is a plan view of the antenna device of the electronic device illustrated in FIG. 11.

FIGS. 11 and 12 are respectively a perspective view and a plan view of an antenna device of an electronic device according to various embodiments of the present disclosure.

Referring to FIGS. 11 and 12, the antenna device 200 includes feeding structure 232 and a ground shorting pin 252. The feeding structure 232 is a direct feeding structure that electrically connects the antenna unit 240 directly to the circuit board 210, as described before. Specifically, the first end 252*a* of the ground shorting pin 252 is directly coupled to a side surface of the connector 221 of the frame 220 and the second end 252*b* of the ground shorting pin 252 is directly coupled to the antenna unit 240.

As illustrated in FIG. 12, the feeding structure 232 includes a bend where the second end 252*b* of the ground shorting pin 252 is substantially perpendicular to the antenna unit 240 and the first end 252*a* of the ground shorting pin 252 is substantially parallel to the antenna unit 240. It is noted that the first end 252*a* of the ground shorting pin 252 is not electrically connected to the front surface of the connector 221 of the frame 220. Instead, the first end 252*a* of the ground shorting pin 252 is electrically connected to the side surface of the connector 221 and extends a predetermined length in a direction substantially parallel to the antenna unit and the second end 252*b* of the ground shorting pin 252 is electrically connected to the antenna unit 240.

Figure 13:
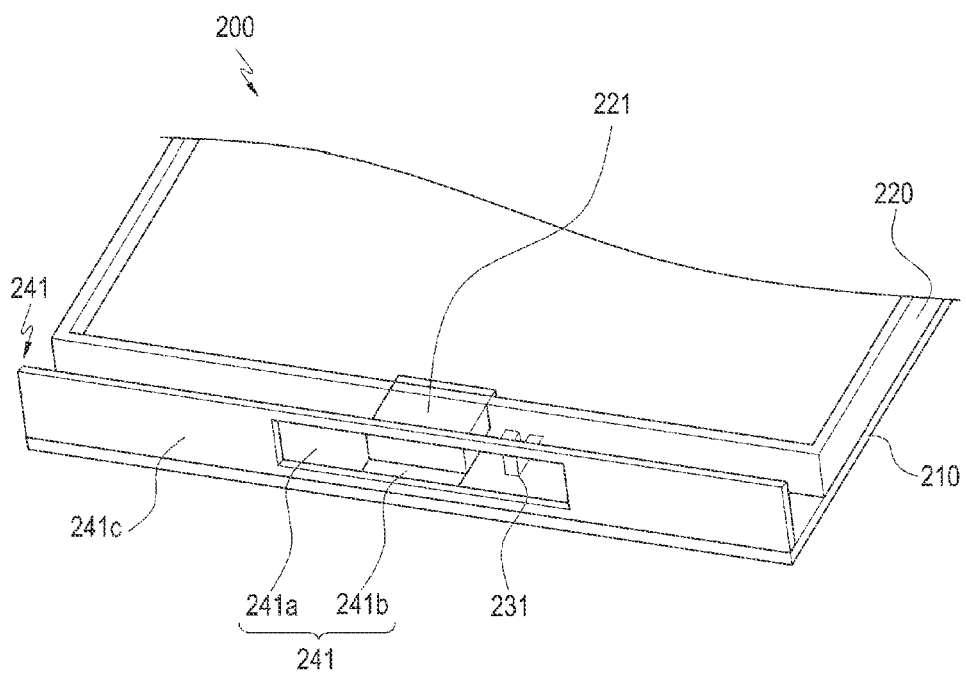
FIG. 13 is a perspective view of an antenna device of an electronic device according to various embodiments of the present disclosure.

FIG. 13 is a perspective view of an antenna device of an electronic device according to an embodiment of the present disclosure.

Referring to FIG. 13, the antenna device 200 includes a slot antenna unit 241 having a slot 241a formed in a plate 214c and a connection portion 241b. The slot 241a is formed at an inner center of the plate 214c of the slot antenna unit 241 in order to improve the radiation performance of the antenna unit 240.

The connection portion 241b is provided in the vicinity of the slot 241a to electrically connect the slot antenna unit 241 to the connector 221 of the frame 220. Specifically, connection portion 241b extends in a substantially perpendicular direction from a surface of the plate 214c of the slot antenna unit 241 and is directly coupled to the connector 221.

In an exemplary embodiment, the slot antenna unit 241 is disposed apart from the frame 220 where the plate 214c is oriented substantially perpendicular to the circuit board 210. The slot 241a may include an antenna hole removed from the plate 214c of the slot antenna unit 241.

The antenna device 200 may further include a feeding structure. As illustrated in FIG. 13, feeding structure 231 is an indirect feeding structure implemented to electrically connect the circuit board 210 with the slot antenna unit 241 indirectly. However, any type of feeding structure may be used to electrically connect the slot antenna unit 241 with the circuit board 210 including a direct feeding structure (not shown)

Figure 14:
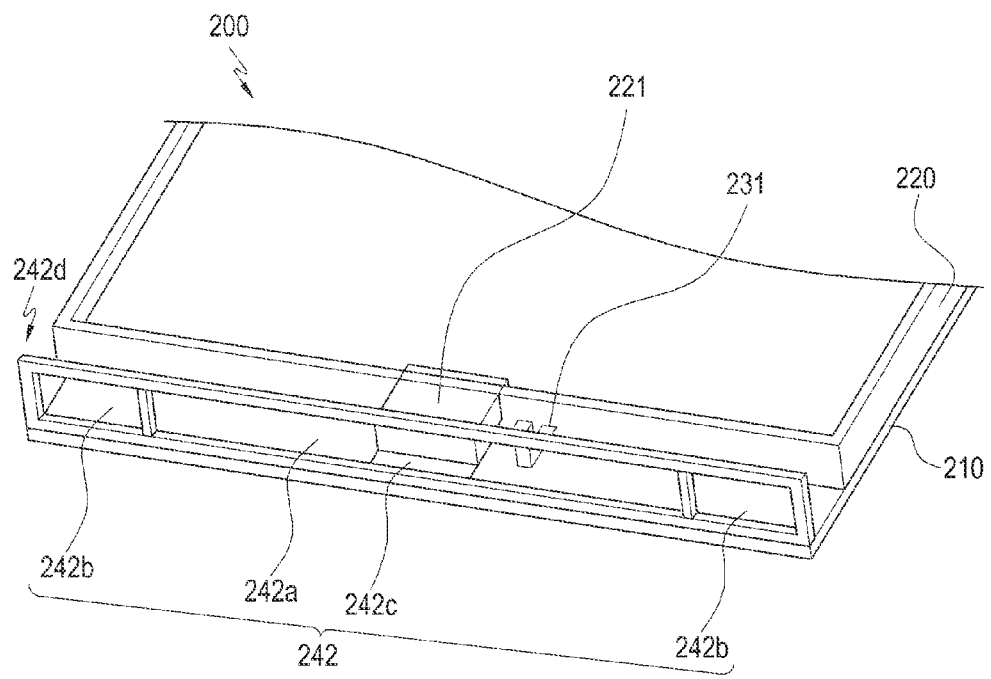
FIG. 14 is a perspective view of an antenna device of an electronic device according to various embodiments of the present disclosure.

FIG. 14 is a perspective view of an antenna device of an electronic device according to an embodiment of the present disclosure.

Referring to FIG. 14, antenna device 200 includes the slot antenna unit 242 formed from a plate 242d. The slot antenna unit 242 includes a first slot 242a, a pair of second slots 242b disposed on either side of the first slot 242a, and a connection portion 242c. In an exemplary embodiment, the first slot 242a has a larger area and is formed between the second slots 242b in order to improve the radiation performance of the antenna unit 240. The second slots 242b are formed at both sides of the first slot 242a to further improve the radiation performance of the antenna unit 240.

The connection portion 242c extends from the plate 242d of the slot antenna unit 242 and is provided in the vicinity of the first slot 242a to electrically connect the slot antenna unit 242 to the connector 221 of the frame 220.

In an exemplary embodiment, the slot antenna unit 242 is disposed apart from the frame 220 such that plate 242d is oriented substantially perpendicular to a surface of the circuit board 210.

The first slot 242a and the second slots 242b may include antenna holes removed from the plate 242d of the slot antenna unit 242.

The antenna device 200 may further include a feeding structure. As illustrated in FIG. 14, feeding structure 231 is an indirect feeding structure implemented to electrically connect the circuit board 210 with the slot antenna unit 242 indirectly. However, any type of feeding structure may be used to electrically connect the slot antenna unit 242 with the circuit board 210 including a direct feeding structure (not shown).

Figure 15:
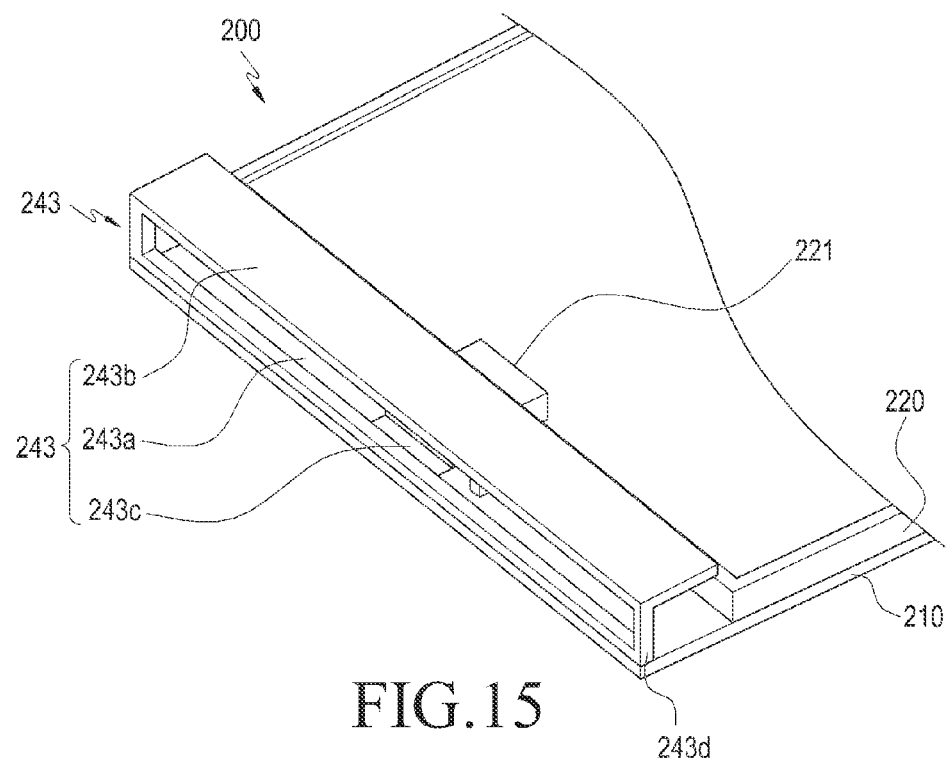
FIG. 15 is a perspective view of an antenna device of an electronic device according to various embodiments of the present disclosure.

FIG. 15 is a perspective view of an antenna device of an electronic device according to an embodiment of the present disclosure.

Referring to FIG. 15, antenna device 200 includes an antenna unit 243. The antenna unit 243 may include a slot 243a formed in a first antenna plate portion 243b, a connection portion 243c, and a second antenna plate portion 243d.

The slot 243a includes an antenna hole formed in the first antenna plate portion 243b of the slot antenna unit 243 in order to improve the radiation performance of the antenna unit 240.

The antenna plate of the antenna unit 243 includes the first antenna plate portion 243b and the second antenna plate portion 243d. The first antenna plate portion 243b extends in a direction substantially parallel to the circuit board 210 and extends in a length direction of the frame 220. The second antenna plate portion 243b is oriented substantially perpendicular to a surface of the circuit board 210. As illustrated in FIG. 15, the first antenna plate portion 243b and the second antenna plate portion 243d may be integrally formed. Alternatively, the first antenna plate portion 243b and the second antenna plate portion 243d may be formed separately and then coupled together.

The connection portion 243c extends from the second antenna plate portion 243d and is provided in the vicinity of the slot 243a to electrically connect the slot antenna unit 243 to the connector 221 of the frame 220.

In an exemplary embodiment, the slot 243a is formed substantially perpendicular to the length direction on the circuit board 210 and the first antenna plate portion 243b is formed bent at the top end of the slot 243a to extend in the length direction of the frame 220 such that the slot antenna unit 243 may have a side surface shape corresponding to an "Γ". In addition, the antenna plate 243b may be disposed between the second antenna plate portion 243d and the frame 220.

The antenna device 200 may further include a feeding structure. As illustrated in FIG. 15, feeding structure 231 is an indirect feeding structure implemented to electrically connect the circuit board 210 with the slot antenna unit 243 indirectly. However, any type of feeding structure may be used to electrically connect the slot antenna unit 243 with the circuit board 210 including a direct feeding structure (not shown).

Figure 16:
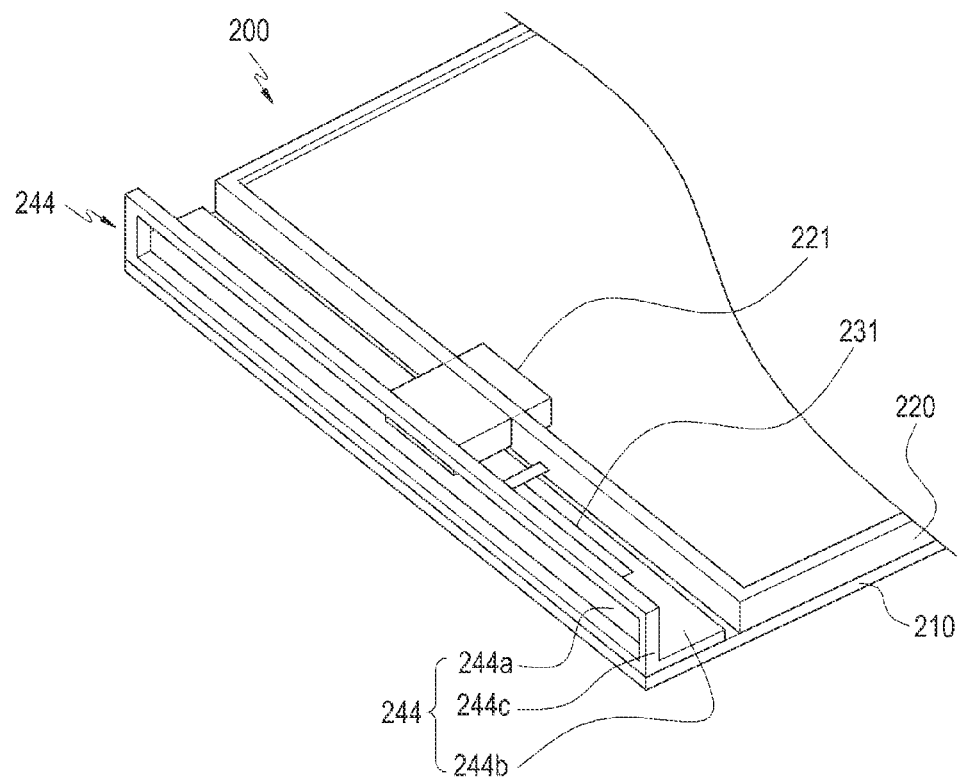
FIG. 16 is a perspective view of an antenna device of an electronic device according to various embodiments of the present disclosure.

FIG. 16 is a perspective view of an antenna device of an electronic device according to an embodiment of the present disclosure.

Referring to FIG. 16, the antenna device 200 includes an antenna unit 244. The antenna unit 244 may include a slot 244a formed in a first antenna plate 244c and a second antenna plate 244b.

The slot 244a includes an antenna hole formed in the first antenna plate 244c of the antenna unit 244 in order to improve the radiation performance of the antenna unit 240.

The second antenna plate 244b may extend from a bottom end of the first antenna plate 244c in the length direction of the frame 220 where the second antenna plate 244b electrically connects the antenna unit 244 to the connector 221 of the frame 220. In other words, the second antenna plate 244b is disposed between the antenna unit 244 and the frame 220 and electrically connected to the connector 221 directly without the need for a connection portion.

In an exemplary embodiment, the first antenna plate 244c is oriented substantially perpendicular to the circuit board 210 and a surface of the second antenna plate 244b directly contacts a surface of the circuit board 210 where the second antenna plate 244b extends in the length direction of the frame 220 such that the antenna unit 244 has a side surface shape corresponding to an "L". As illustrated in FIG. 16, the first antenna plate 244c and the second antenna plate 244b may be integrally formed. Alternatively, the first antenna plate 244c and the second antenna plate 244b may be formed separately and then coupled together.

The antenna device 200 may further include a feeding structure. As illustrated in FIG. 16, feeding structure 231 is an indirect feeding structure implemented to electrically connect the circuit board 210 with the antenna unit 244 indirectly. However, any type of feeding structure may be used to electrically connect the antenna unit 244 with the circuit board including a direct feeding structure (not shown).

Figure 17:
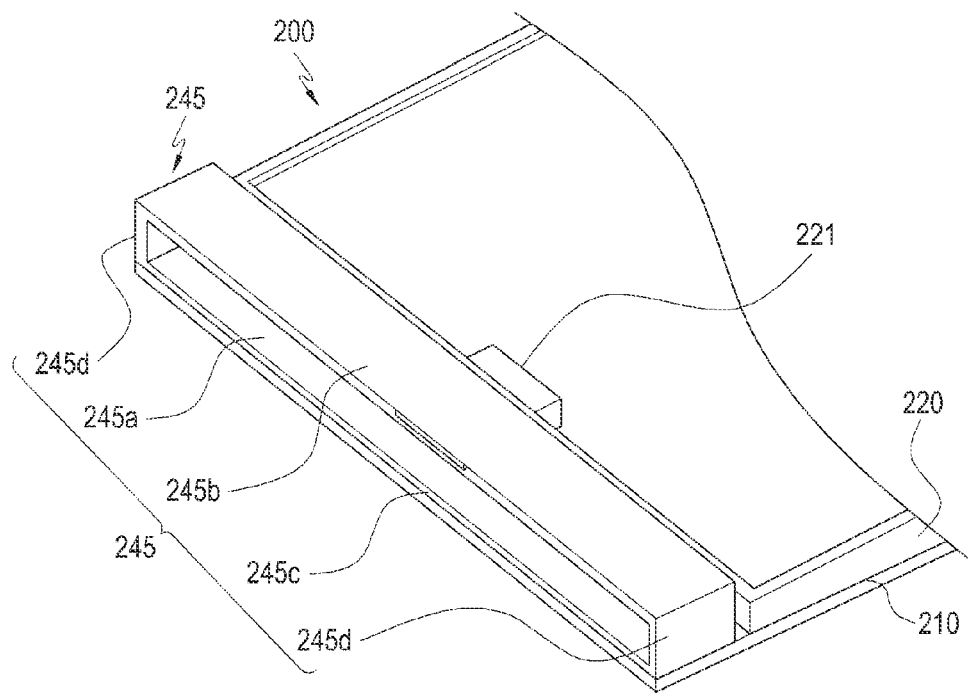
FIG. 17 is a perspective view of an antenna device of an electronic device according to various embodiments of the present disclosure.

FIG. 17 is a perspective view of an antenna device of an electronic device according to an embodiment of the present disclosure.

Referring to FIG. 17, antenna device 200 includes an antenna unit 245. The antenna unit 245 includes a slot 245*a*, a first antenna plate 245*b*, a second antenna plate 245*c*, and a pair of link portions 245*d*.

The slot 245*a* includes an antenna hole formed by the first antenna plate 245*b*, the second antenna plate 245*c*, and the pair of link portions 245*d* in order to improve the radiation performance of the antenna unit 240.

The first antenna plate 245*b* and the second antenna plate 245*c* extend in the length direction of the frame 220. In addition, the second antenna plate 245*c* electrically connects the antenna unit 245 with the connector 211 of the frame 220.

The pair of link portions 245*d* are formed respectively at both ends of the first and second antenna plates 245*b* and 245*c* to connect the first antenna plate 245*b* to the second antenna plate 245*c* such that the first antenna plate 245*b* is substantially parallel to the second antenna plate 245*c*. As illustrated in FIG. 17, the first antenna plate 245*b*, a second antenna plate 245*c*, and a pair of link portions 245*d* may be integrally formed. Alternatively, one or more of the first antenna plate 245*b*, a second antenna plate 245*c*, and a pair of link portions 245*d* may be formed separately and then coupled together.

The slot 245*a* of antenna unit 245 is arranged substantially perpendicular to the circuit board 210 on the circuit board 210 where the first and second antenna plates 245*b* and 245*c* and the pair of link portions 245*d* may be bent at the upper and lower ends of the slot 245*a* and extend in the length direction of the frame 220.

The first and second antenna plates 245*b* and 245*c* and the pair of link portions 245*d* may be disposed between the frame 220 and the end of the circuit board 210 where a side surface of the antenna unit 245 has a predetermined thickness between the antenna unit 245 and the frame 220. In addition, the second antenna plate 245*b* may be electrically connected directly to the connector 221 without the need for an additional connection portion.

The antenna device 200 may further include a feeding structure. For example, while not illustrated in FIG. 17, antenna device 200 may include a direct or indirect feeding structure to electrically connect the circuit board 210 with the antenna unit 245.

Figure 18:
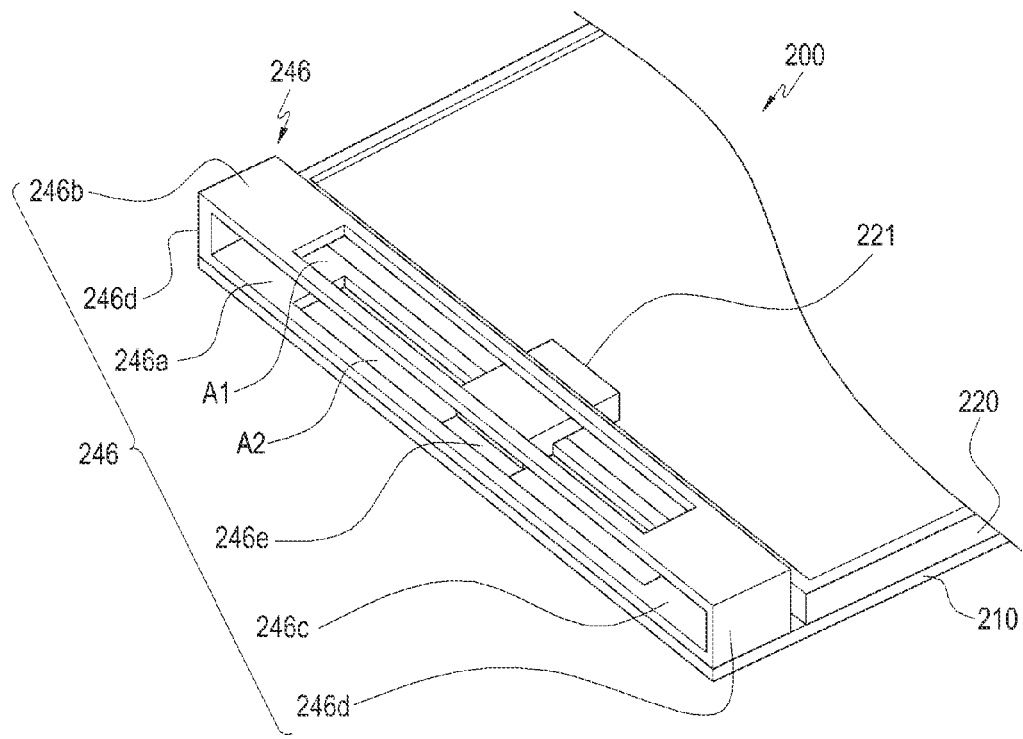
FIG. 18 is a perspective view of an antenna device of an electronic device according to various embodiments of the present disclosure.

FIG. 18 is a perspective view of an antenna device of an electronic device according to an embodiment of the present disclosure.

Referring to FIG. 18, the antenna device 200 includes an antenna unit 246. Antenna unit 246 includes a first slot 246*a*, a second slot A1 formed in a first antenna plate 246*b*, a third slot A2 formed in a second antenna plate 246*c*, a pair of link portions 246*d*, and a connection portion 246*e*.

The first slot 246*a* is an antenna hole formed inside the antenna unit 246 in order to improve the radiation performance of the antenna unit 240. In an exemplary embodiment, the first slot 246*a* is bounded by the first antenna plate 246*b*, the second antenna plate 246*c*, and the pair of link portions 246*d* such that the first slot 246*a* is orientated substantially parallel to the circuit board 210.

The second slot A1 is an antenna hole formed into the first antenna plate 246*b* and extends in the length direction of the frame 220.

The third slot A2 is an antenna hole formed into the second antenna plate 246*c* and extends in the length direction of the frame 220. The second slot A1 and the third slot A2 are substantially parallel to each other and separated by the pair of link portions 246*d* where the pair of link portions 246*d* is formed respectively at both ends of the first and second antenna plates 246*b* and 246*c* to connect the first antenna plate 246*b* to the second antenna plate 246*c*.

The connection portion 246*e* is formed on the second antenna plate 246*c* to electrically connect the antenna unit 246 to the connector 221 of the frame 220.

In an exemplary embodiment, the first slot 246*a* is oriented substantially perpendicular to the circuit board 210 and the first and second antenna plates 246*b* and 246*c* and the pair of link portions 246*d* are formed bent at the top and bottom ends of the first slot 246*a* and extended in the length direction of the frame 220. In other words, the first and second antenna plates 246*b* and 246*c* and the pair of link portions 246*d* may be disposed between the frame 220 and the edge of the circuit board 210. In addition, the connection portion 246*e* is formed inside the second antenna plate 246*c* to electrically couple the antenna unit 246 with frame 220 via the connector 221.

A side surface of the antenna unit 246 has a predetermined thickness between the antenna unit 246 and the frame 220.

As the first slot 246*a*, the second slot A1, and the third slot A2 are formed in the antenna unit 246, the radiation performance of the antenna can be increased and multiple bands and a wide band can be implemented.

The antenna device 200 may further include a feeding structure. For example, while not illustrated in FIG. 18, antenna device 200 may include a direct or indirect feeding structure to electrically connect the circuit board 210 with the antenna unit 246.

Figure 19:
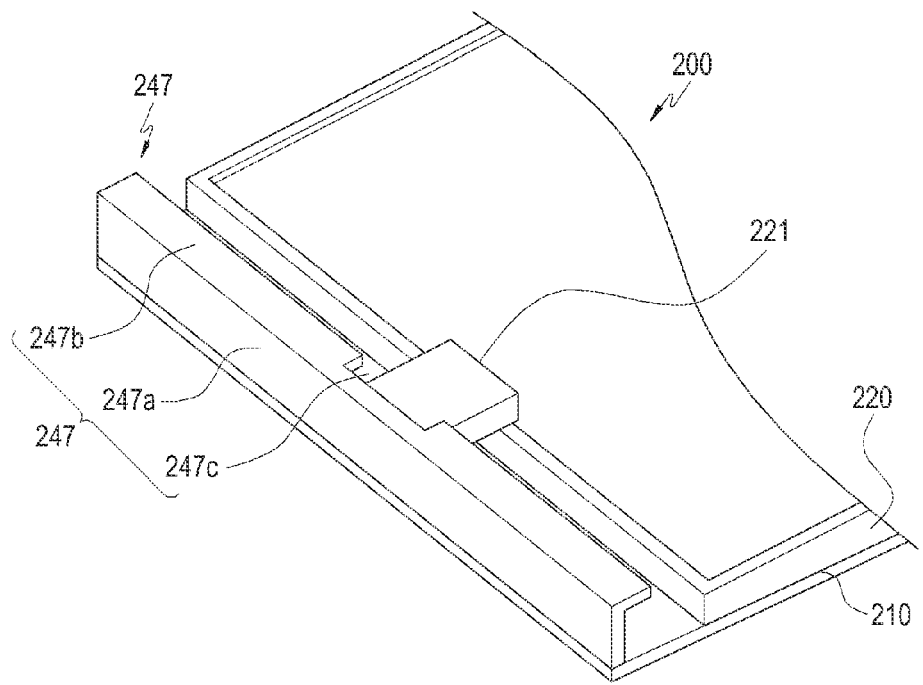
FIG. 19 is a perspective view of an antenna device of an electronic device according to various embodiments of the present disclosure.

FIG. 19 is a perspective view of an antenna device of an electronic device according to an embodiment of the present disclosure.

Referring to FIG. 19, the antenna device 200 includes an antenna unit 247. Antenna unit 247 includes a first antenna plate 247*a*, a second antenna plate 247*b*, a slot 247*c* formed in the second antenna plate 247*b*, and a connection portion (not shown).

The first antenna plate 247*a* is disposed substantially perpendicular along the length direction of the frame 220, supporting the second antenna plate 247*b* as described later.

The second antenna plate 247*b* may be bent from one end of the first antenna plate 247*a*, to extend in the length direction of the frame 220.

The slot 247*c* is formed at the center of the second antenna plate 247*b* in order to improve the radiation performance of the antenna unit.

The connection portion (not shown) may be formed on or coupled with the first antenna plate 247*a* to electrically connect the antenna unit 247 with the connector 221 of the frame 220.

In an exemplary embodiment, the first antenna plate 247*a* is disposed on the circuit board 210 and is oriented substantially perpendicular to a surface of the circuit board 210. In addition, the second antenna plate 247*b* extends from the first antenna plate 247*a* such that the second antenna plate 247*b* is oriented substantially parallel to the circuit board 210 on the top end of the first antenna plate 247*a*. As illustrated in FIG. 19, the first antenna plate 247a and the second antenna plate 247b are integrally formed and have a side surface shape corresponding to "T". However, the first antenna plate 247a may be separately formed from the second antenna plate 247b and then coupled together.

The antenna device 200 may further include a feeding structure. For example, while not illustrated in FIG. 19, the antenna device 200 may include a direct or indirect feeding structure to electrically connect the circuit board 210 with the antenna unit 247. In an exemplary embodiment, the feeding structure may be disposed on either or both sides of the connection unit 221 of the frame 220. That is, the feeding structure may be disposed at corners of both side surfaces between the frame 220 and the antenna unit 247.

Figure 20:
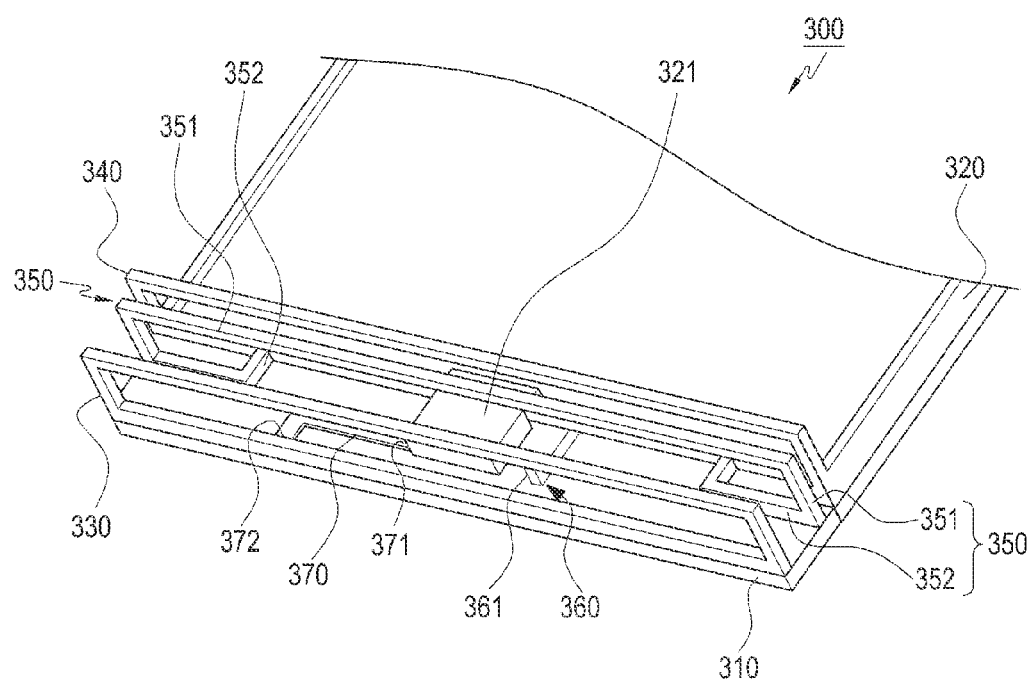
FIG. 20 is a perspective view of an antenna device in an electronic device according to various embodiments of the present disclosure.

FIG. 20 is a perspective view of an antenna device in an electronic device according to an embodiment of the present disclosure.

Referring to FIG. 20, an antenna device 300 includes a circuit board 310, a frame 320, a first antenna unit 330, a second antenna unit 340, a third antenna unit 350, and a feeding structure 360.

The circuit board 310 is provided inside the electronic device to be electrically connected to the first, second, and third antenna units 330, 340, and 350 through the later-described feeding structure 360.

The frame 320 may be extended in a length direction, surrounding a display (e.g., display 150 in FIG. 2) of the electronic device (e.g., electronic device 10 in FIGS. 1 and 2) on the circuit board 310.

The first antenna unit 330 may be disposed substantially perpendicular to the circuit board 310 and spaced apart from the frame 320.

The second antenna unit 340 may be disposed substantially perpendicular to the circuit board 310. In an exemplary embodiment, second antenna unit 340 may be integrally formed on one end of the frame 320. However, the second antenna unit 340 may be formed separately from frame 320 and then coupled to the frame 320.

The third antenna unit 350 may be disposed substantially perpendicular to the circuit board 310 between the first and second antenna units 330 and 340.

The feeding structure 360 may be formed on the circuit board 310 to electrically connect the first, second, and third antenna units 330, 340, and 350 directly or indirectly to the circuit board 310. The feeding structure 360 may be a direct feeding structure or an indirect feeding structure In an exemplary embodiment, as illustrated in FIG. 20, the feeding structure 360 includes an indirect feeding structure 361. The indirect feeding structure 361 may connect the circuit board 310 indirectly to the first, second, and third antenna units 330, 340, and 350. However, alternatively or in addition to the indirect feeding structure 361, feeding structure 360 may include a direct feeding structure to connect the circuit board 310 directly to the first, second, and third antenna units 330, 340, and 350.

As described above, since the first, second, and third antenna units 330, 340, and 350 are arranged substantially perpendicular to the circuit board 310 and configured to be electrically connected to the circuit board 310 by means of the feeding structure 360, the antenna device 300 may support multiple bands and a wide band.

For example, the first antenna unit 330 generates existing resonance and the second and third antenna units 340 and 350 generate additional resonance different from the resonance generated by the first antenna unit 330. Therefore, in addition to a conventional frequency band supported by the first antenna unit 330, intended frequency bands may be supported by the second and third antenna units 340 and 350. As a consequence, wide-band or multi-band characteristics can be achieved.

Further, a ground shorting pin 370 may be provided among the first, second, and third antenna units 330, 340, and 350 to electrically connect a ground surface of the frame to a ground surface of the antenna.

A first end 371 of the ground shorting pin 370 is electrically connected to a side surface of a connector of the frame 320 and a second end 372 of the ground shorting pin 370 is bent and electrically connected to the first antenna unit 330.

The third antenna unit 350 includes a vertical portion 351 and a bent portion 352. The vertical portion 351 may be disposed substantially perpendicular to the surface of the circuit board 310. The bent portion 352 may be bent under the vertical portion 351 to be connected to the frame 320.

As illustrated in FIG. 20, the vertical portion 351 is disposed between the first and second antenna units 330 and 340 and oriented substantially perpendicular to the circuit board 310 and the bent portion 352 is bent under the vertical portion 351 and extends substantially horizontal with respect to the circuit board 310 in electrical connection to the frame 320.

The feeding structure 360 may include a plurality of feeding structures. For example, while not illustrated in FIG. 20, a first feeding structure may be disposed at a first end of the frame and a second feeding structure may be disposed at a second end of the frame between the frame 320 and the first, second, and third antenna units 330, 340, and 350 to ensure robustness of the frame 320 and the first, second, and third antenna units 330, 340, and 350. That is, the feeding structure 360 may be disposed at corners of both side surfaces between the frame 320 and the first, second, and third antenna units 330, 340, and 350 on either or both sides of a connector 321 of the frame 320.

The first, second, and third antenna units 330, 340, and 350 may be slot antenna units. Various embodiments of a slot antenna unit have been described before with reference to FIGS. 13 and 14 and thus will not be described herein.

Figure 21:
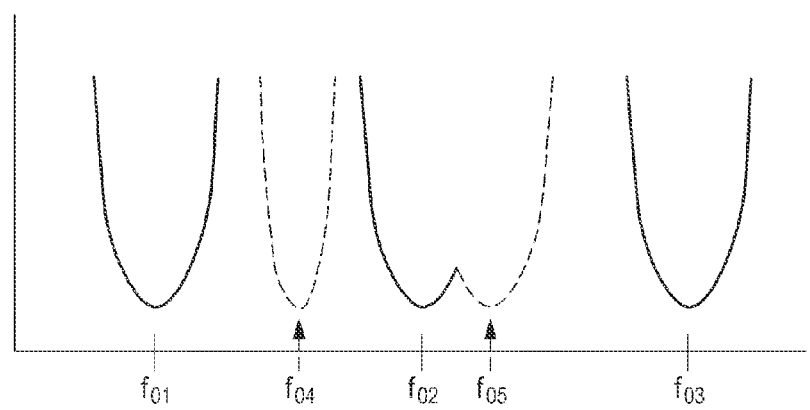
FIG. 21 is a graph illustrating resonant frequencies associated with the antenna device illustrated in FIG. 20 according to various embodiments of the present disclosure.

FIG. 21 is a graph illustrating resonant frequencies associated with each of the first, second, and third antenna units 330, 340, and 350 illustrated in FIG. 20.

Referring to FIG. 21, resonant frequencies f01, f02, and f03 are associated with the first antenna unit 330, resonant frequency f04 is associated with the second antenna unit 340, and resonant frequency f05 is associated with the third antenna unit 350 according to an embodiment of the present disclosure.

Referring to FIG. 21, due to the configuration and orientation of the first, second, and third antenna units 330, 340, and 350, the resonant frequency capabilities of the electronic device may be extended and wide-band or multi-band characteristics can be achieved and implemented. For example, as illustrated in FIG. 21, an additional resonant frequency f04 associated with the second antenna unit 340 may be added between resonant frequency f01 and f02. In addition, resonant frequency f02 may be expanded to further include resonant frequency f05.

Figure 22:
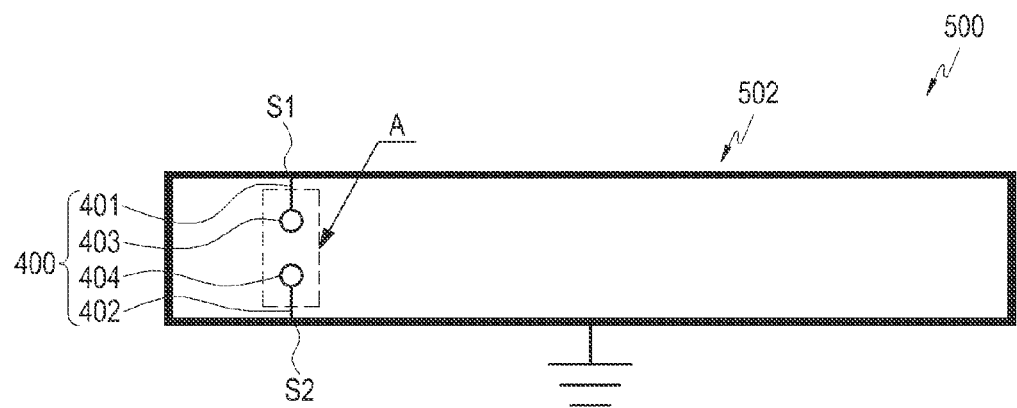
FIG. 22 is a view illustrating an embodiment of an antenna device in an electronic device according to various embodiments of the present disclosure.
Figure 23:
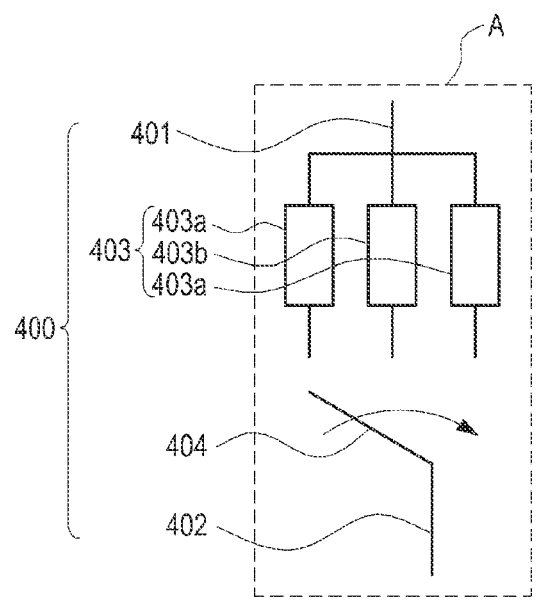
FIG. 23 is an enlarged view of part A illustrated in FIG. 22 according to various embodiments of the present disclosure.

FIG. 22 illustrates an antenna device in an electronic device according to an embodiment of the present disclosure and FIG. 23 is an enlarged view of part A illustrated in FIG. 22 according to an embodiment of the present disclosure.

It is to be noted that the components readily understood from the components of the foregoing embodiments are denoted by like reference numerals or no reference numerals and their detailed description may be omitted in describing the antenna device illustrated in FIGS. 22 and 23.

Referring to FIGS. 22 and 23, the antenna device 500 includes a variable antenna device 400 and an antenna unit 502. The antenna device 500 may be implemented with an electronic device such as electronic device 10 illustrated in FIG. 1. Antenna unit 502 may be any antenna unit such as antenna unit 240, 241, 242, 243, 244, 245, 246, 330, 340, and/or 350 as illustrated in FIGS. 4-20.

In an exemplary embodiment, when antenna unit 502 is a single antenna unit such as antenna units 240, 241, 242, 243, 244, 245, 246, the variable antenna device 400 is coupled to the antenna unit 502 so that the variable antenna device 400 may electrically connect one point (a first point S1) of the antenna unit 502 with another point (a second point S2) of the antenna unit 502. When the variable antenna device 400 modifies the first point S1 and/or the second point S2, an antenna frequency of the antenna unit 502 may change. In an exemplary embodiment, the changes in antenna frequency allow the electronic device to achieve wide-band or multi-band characteristics using the antenna unit 502.

In another exemplary embodiment, antenna unit 502 may include multiple antennas within the electronic device. For example, antenna unit 502 may include the first antenna unit 330, the second antenna unit 340, and the third antenna unit 350 as illustrated in FIG. 20.

According to various embodiments of the present disclosure, the antenna unit 502 may include a slot antenna unit or a loop antenna unit.

The variable antenna device 400 may be disposed inside the antenna unit 502 or the variable antenna device 400 may be coupled to the antenna unit 502 from a position exterior to the antenna unit 502.

Referring to FIGS. 22 and 23, the variable antenna device 400 includes a first contact point 401 and a second contact point 402. The first contact point 401 is electrically coupled to the first point S1 of antenna unit 502 and the second contact point 402 is electrically coupled to the second point S2 of the antenna unit 502.

The variable antenna device 400 may further include one or more lumped elements 403 and a switch 404. The lumped elements 403 are electrically coupled to the first point S1 of the antenna unit 502. Referring to FIG. 23, the lumped elements 403 include two first lumped elements 403a and a second lumped element 403b. However, antenna device 500 may include any number of lumped elements. In an exemplary embodiment, the first lumped element 403a may include a capacitor and the second lumped element 403b may include an inductor. In addition, the lumped elements 403 may include various other elements.

The lumped elements 403 are arranged in parallel where the switch 404 may selectively contact one of the first lumped elements 403a and the second lumped element 403b. When the switch 404 contacts the respective lumped element, the frequency of the antenna unit 502 may be modified such that a variable frequency is generated.

In an exemplary embodiment, when antenna unit 502 is a single antenna unit such as antenna unit 240, 241, 242, 243, 244, 245, or 246, the switch 404 is electrically coupled to the second point S2 of the antenna unit 502 and selectively contacts one of the first lumped elements 403a and the second lumped element 403b to control an on/off operation associated with the circuit board 210 thereby generating a variable frequency with a single antenna unit.

In another exemplary embodiment, when antenna unit 503 includes a plurality of antenna units such as the first antenna unit 330, the second antenna unit 340, and the third antenna unit 350, the antenna device 500 may include any number of lumped element devices 403. For example, the number of lumped element devices may correlate to the number of antenna units within the electronic device, a number of connection points on one of the plurality of antenna units, or a combination thereof.

For instance, each of the lumped elements 403 may be associated with one antenna unit where one of the first lumped elements 403a may be associated with the first antenna unit 330, the second lumped element 403b may be associated with the second antenna unit 340, and the second of the first lumped elements 403a may be associated with the third antenna unit 330. Alternatively, the lumped elements may be associated with a plurality of points on a single one of the plurality of antenna units 330, 340, 350 where one of the first lumped elements 430a may be associated with a first point S1 of the first antenna unit 330, the second lumped element 430b may be associated with a second point S2 of the first antenna 330, etc.

In another exemplary embodiment, the first contact point 401 of the variable antenna device 400 electrically contacts the first point S1 at one portion of the first, second, and third antenna units 330, 340, and 350, and the second contact point 402 electrically contacts the second point S2 at the other portion of the first, second, and third antenna units 330, 340, and 350. In addition, the lumped elements 403 are arranged in parallel so that the lumped elements 403 may contact the switch 404 while electrically contacting the first point S1 of the first, second, and third antenna units 330, 340, and 350. The switch 404 electrically contacts the second point S2 of the first, second, and third antenna units 330, 340, and 350 so that as the switch 404 controls an on/off operation on the circuit board 210, the switch 404 may selectively contact the lumped elements 403 and thus generate a variable frequency.

In an exemplary embodiment, the switch 404 may be any type of switch having at least one input path and at least one output path. For example, switch 404 may be one of a single pole double throw (SPDT) switch, a single pole four throw (SP4T) switch, a single pole single throw (SPST) switch, and a single pole three throw (SPTT) switch.

It is noted that while switch 404 is illustrated in FIG. 23 as having one input path and two output paths (e.g., a SPDT switch), switch 404 may include any number of output paths. For example, when switch 404 is a SP4T switch, switch 404 may include one input path and four output paths. When switch 404 is a SPST switch, switch 404 may include one input path and one output path. When switch 404 is a SP4T switch, switch 404 may include one input path and three output paths.

In an exemplary embodiment, as the switch 404 is articulated to electrically contact each of the lumped elements 403a, 403b, the length of time the switch 404 contacts each element may be selectively modified according to an on/off operation such that an antenna frequency is changed and determined. Therefore, wideband characteristics of the antenna device can be achieved. Moreover, since the switch 404 increases the physical length of the antenna unit by selecting one of the parallel lumped elements 403, a frequency band required for the electronic device can be changed, a high radiation efficiency can be achieved in each of various frequency bands, and degradation of the radiation performance of the antenna can be prevented.

Referring to FIGS. 22 and 23, the variable switch 404 will be described in detail.

If the switch 404 of the variable antenna device 400 is placed in an off state under control of a circuit board (e.g., circuit board 210 or 310), the frequency band of the antenna device may be set according to a physical length of the antenna unit 502. If the switch 404 of the variable antenna device 400 is in an on state, the frequency band of the antenna device may be set according to a physical length of the antenna unit 502 and a reactance component of one of the lumped elements 403 when the switch 404 electrically contacts the lumped element 403.

A signal current applied to the antenna unit 502 is distributed across a path that passes through the lumped element 403 even when the switch 404 is in the on state. Thus, loss caused by the resistance component of the switch 404 can be suppressed.

In an exemplary embodiment, if the switch 404 is in the off state, the switch 404 does not electrically contact any of the lumped elements 403. Thus, the physical length of the antenna unit 504 is short. On the other hand, if the switch 404 is in the on state, the switch 404 is controlled to select and electrically contact one of the lumped elements 403 arranged in parallel. As the selected lumped element 403 electrically contacts the switch 404, the physical length of the antenna unit 504 gets increases.

Since the switch 404 increases the physical length of the antenna unit 504 by selecting one of the parallel lumped elements 403, wideband characteristics of the antenna device can be achieved and a high radiation efficiency can be acquired in frequency bands required for the electronic device. Therefore, the radiation performance of the antenna can be increased.

Figure 24:
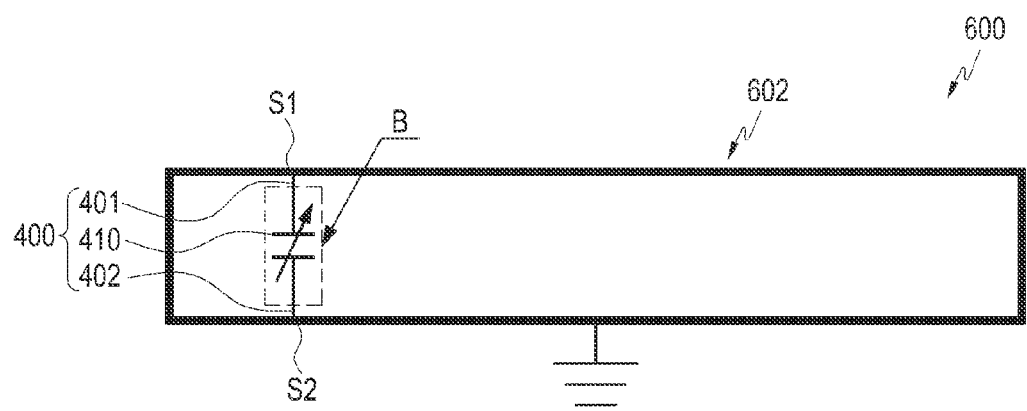
FIG. 24 is a view illustrating another embodiment of an antenna device in an electronic device according to various embodiments of the present disclosure.
Figure 25:
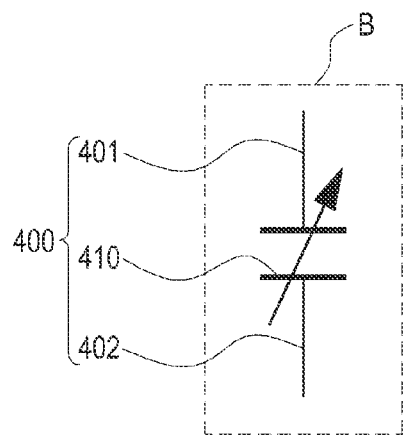
FIG. 25 is an enlarged view of part B illustrated in FIG. 24 according to various embodiments of the present disclosure.

FIG. 24 illustrates an antenna device in an electronic device according to an embodiment of the present disclosure and FIG. 25 is an enlarged view of part B illustrated in FIG. 24 according to an embodiment of the present disclosure.

It is to be noted that the components readily understood from the components of the foregoing embodiments are denoted by like reference numerals or no reference numerals and their detailed description may be omitted in describing the antenna device illustrated in FIGS. 24 and 25.

Referring to FIGS. 24 and 25, the antenna device 600 includes the antenna unit 602 and the variable antenna device 400. The antenna device 600 may be implemented with an electronic device such as electronic device 10 illustrated in FIG. 1. Antenna unit 602 may be any antenna unit such as antenna unit 240, 241, 242, 243, 244, 245, 246, 330, 340, and/or 350 as illustrated in FIGS. 4-20.

In an exemplary embodiment, when antenna unit 502 is a single antenna unit such as antenna units 240, 241, 242, 243, 244, 245, 246, the variable antenna device 400 is coupled to the antenna unit 602 so that it may electrically connect one point (the first point S1) of the antenna unit 602 with another point (the second point S2) of the antenna unit 602. When the variable antenna device 400 modifies the first point S1 and/or the second point S2, an antenna frequency of the antenna unit 602 may change. In an exemplary embodiment, the changes in antenna frequency allow the electronic device to achieve wide-band or multi-band characteristics using the antenna unit 602.

In another exemplary embodiment, antenna unit 602 may include a plurality of antennas within the electronic device. For example, antenna unit 602 may include the first antenna unit 330, the second antenna unit 340, and the third antenna unit 350 as illustrated in FIG. 20.

According to various embodiments of the present disclosure, the antenna unit 602 may include a slot antenna unit or a loop antenna unit.

In an exemplary embodiment, when the antenna unit 502 is a single antenna unit such as antenna units 240, 241, 242, 243, 244, 245, 246, the variable antenna device 400 is disposed inside the antenna unit 602 or the variable antenna device 400 may be coupled to the antenna unit 602 from a position exterior to the antenna unit 602.

In another exemplary embodiment, when the antenna unit 502 includes a plurality of antenna units such as antenna units 330, 340, 350, the variable antenna device 400 is disposed among the first, second, and third antenna units 330, 340, and 350 so that it may electrically connect one point (the first point S1) of the first, second, and third antenna units 330, 340, and 350 to another point (the second point S2) of the first, second, and third antenna units 330, 340, and 350 and may change an antenna frequency.

Referring to FIGS. 24 and 25, the variable antenna device 400 includes the first contact point 401 and the second contact point 402. The first contact point 401 electrically contacts the first point S1 at one portion of the antenna unit 602, and the second contact point 402 electrically contacts the second point S2 at the other portion of the antenna unit 602, as illustrated in FIG. 24.

In an exemplary embodiment, where the antenna unit 602 includes a plurality of antenna units such as antenna units 330, 340, 350, the variable antenna device 400 includes the first contact point 401 and the second contact point 402. The first contact point 401 electrically contacts the first point S1 at one portion of the first, second, and third antenna units 330, 340, and 350, and the second contact point 402 electrically contacts the second point S2 at the other portion of the first, second, and third antenna units 330, 340, and 350, as illustrated in FIG. 24.

The variable antenna device 400 may include a variable capacitor 410 disposed to electrically contact between the first and second points S1 and S2.

The variable capacitor 410 may be controlled via a circuit board such as circuit board 210 or 310 and may change a capacitance. The variable capacitor 410 may create variable frequency characteristics by controlling the capacitance. That is, the variable capacitor 410 may change and determine an antenna frequency according to the capacitance.

In an exemplary embodiment, the variable capacitor 410 is disposed in the antenna unit 602 where the value of the variable capacitor 410 is controlled by the circuit board 210.

In another exemplary embodiment, when the antenna unit 602 includes a plurality of antenna units such as antenna units 330, 340, 350, the variable capacitor 410 is disposed among the first, second, and third antenna units 330, 340, and 350 and the value of the variable capacitor 410 is controlled by the circuit board 210.

For example, if the value of the variable capacitor 410 ranges from 1.5 pF to 8 pF, a frequency is determined according to 1.5 pF/3.0 pF/8 pF.

As a frequency band required for the electronic device is determined by changing a frequency according to the value of the variable capacitor 410, wideband characteristics of an antenna can be readily achieved and the radiation efficiency and performance of the antenna can be increased.

As is apparent from the foregoing description, according to various embodiments of the present disclosure, in an electronic device having a frame and a circuit board, an antenna unit is disposed in a plane different from the surface of the circuit board. Therefore, the frame may be separate from the antenna device, thereby reducing mutual interference between the frame and the antenna device, preventing degradation of the radiation performance of the antenna, and preventing an undesirable radiation pattern. Further, the mounting space of the antenna device can be decreased, thus making it possible to miniaturize the electronic device and enhance the outward appearance of the electronic device.

In addition, as a plurality of antenna units are arranged substantially perpendicular in a length direction of the frame, resonant frequencies are generated from an existing antenna unit and added antenna units. Therefore, intended frequency bands as well as a frequency band supported by the existing antenna unit can be supported, achieving multiple bands and a wide band.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a circuit board;
a frame disposed on the circuit board, the frame being configured to surround a display of the electronic device;
a feeding structure formed on the circuit board; and
a slot antenna disposed on the circuit board, in a plane at a predetermined angle with respect to a surface of the circuit board,
wherein the slot antenna is disposed outside of the frame,
wherein the slot antenna is spaced apart from the frame and in electrical connection with the feeding structure, and
wherein the slot antenna comprises:
a slot formed inside the slot antenna,
a first antenna plate that is bent at a top end of the slot, and
a second antenna plate that is bent at a bottom end of the slot,
wherein the first antenna plate is extended in a length direction of the frame,
wherein the second antenna plate is extended in the length direction of the frame,
wherein the second antenna plate electrically connects the slot antenna to a connector provided in the frame,
wherein the slot antenna further comprises a pair of link portions formed at both ends of the first and second antenna plates, and
wherein the pair of link portions connect the first antenna plate and the second antenna plate.

2. The electronic device of claim 1,
wherein the feeding structure is one of an indirect feeding structure and a direct feeding structure, and
wherein the indirect feeding structure connects the circuit board to the slot antenna indirectly and the direct feeding structure connects the circuit board to the slot antenna directly.

3. The electronic device of claim 1, wherein the slot antenna is disposed substantially perpendicular to the surface of the circuit board.

4. The electronic device of claim 1, further comprising a ground shorting pin provided between the frame and the slot antenna to electrically connect a ground surface of the frame to a ground surface of the slot antenna.

5. The electronic device of claim 4, wherein the ground shorting pin is provided at a connector provided in the frame and electrically connects the ground surface of the frame to the ground surface of the slot antenna through the connector.

6. The electronic device of claim 4, wherein one end of the ground shorting pin is electrically connected to the frame and the other end of the ground shorting pin is electrically connected to the slot antenna.

7. The electronic device of claim 4, wherein one end of the ground shorting pin is electrically connected to a side surface of a connector provided in the frame and the other end of the ground shorting pin is bent and electrically connected to the slot antenna.

8. The electronic device of claim 1,
wherein the slot antenna further comprises a connection portion disposed in the vicinity of the slot, and
wherein the connection portion electrically connects the slot antenna to a connector provided in the frame.

9. The electronic device of claim 1,
wherein the slot antenna further comprises:
a pair of second slots formed at both sides of the first slot, and
a connection portion disposed in the vicinity of the first slot, and
wherein the connection portion electrically connects the slot antenna to a connector provided in the frame.

10. The electronic device of claim 1,
wherein the first antenna plate is bent at a top end of the slot and extended in a length direction of the frame,
wherein the slot antenna further comprises a connection portion disposed in the vicinity of the slot, and
wherein the connection portion electrically connects the slot antenna to a connector provided in the frame.

11. The electronic device of claim 1,
wherein the first antenna plate is bent at a bottom end of the slot and extended in a length direction of the frame, and
wherein the antenna plate electrically connects the slot antenna to a connector provided in the frame.

12. The electronic device of claim 1,
wherein the first antenna plate is extended in a length direction of the frame and includes a second slot inside the first antenna plate,
wherein the second antenna plate is extended in the length direction of the frame and includes a third slot inside the first antenna plate,
wherein the slot antenna further comprises:
a pair of link portions formed both ends of the first and second antenna plates, wherein the pair of link portions connect the first antenna plate and the second antenna plate, and
a connection portion formed on the second antenna plate, and
wherein the connection portion electrically connects the slot antenna to a connector provided in the frame.

13. The electronic device of claim 1,
wherein the first antenna plate is disposed substantially perpendicular in a length direction of the frame,
wherein the second antenna plate is extended in the length direction of the frame,
wherein a slot is formed on the second antenna plate,
wherein the slot antenna further comprises a connection portion formed on the first antenna plate, and
wherein the connection portion electrically connects the slot antenna to a connector provided in the frame.

14. The electronic device of claim 1, wherein the feeding structure is disposed at both ends between the frame and the antenna.

15. An electronic device comprising:
a circuit board;
a frame disposed on the circuit board, the frame being configured to surround a display of the electronic device;
a first antenna disposed on the circuit board, in a first plane at a first predetermined angle with respect to a surface of the circuit board;

a second antenna disposed on the circuit board, apart from the first antenna, in a second plane at a second predetermined angle with respect to the surface of the circuit board;
a third antenna disposed on the circuit board, between the first antenna and the second antenna, in a third plane at a third predetermined angle with respect to the surface of the circuit board; and
a feeding structure formed on the circuit board,
wherein one of the first antenna, the second antenna, and the third antenna, is disposed outside of the frame and spaced apart from the frame,
wherein the feeding structure electrically connects the first antenna, the second antenna, and the third antenna to the circuit board,
wherein at least one of the first antenna, the second antenna, or the third antenna is a slot antenna, and
wherein the slot antenna comprises:
a slot formed inside the slot antenna,
a first antenna plate that is bent at a top end of the slot, and
a second antenna plate that is bent at a bottom end of the slot,
wherein the first antenna plate is extended in a length direction of the frame,
wherein the second antenna plate is extended in the length direction of the frame,
wherein the second antenna plate electrically connects the slot antenna to a connector provided in the frame,
wherein the slot antenna further comprises a pair of link portions formed at both ends of the first and second antenna plates, and
wherein the pair of link portions connect the first antenna plate and the second antenna plate.

16. The electronic device of claim 15, wherein the third antenna comprises:
a vertical portion disposed substantially perpendicular to the surface of the circuit board; and
a bent portion bent at a lower part of the vertical portion and connected to the frame.

17. The electronic device of claim 15, wherein the feeding structure is disposed at both ends between the frame and the first antenna, the second antenna, and the third antenna.

18. An electronic device comprising:
a circuit board;
a frame disposed on the circuit board, the frame being configured to surround a display of the electronic device;
a feeding structure formed on the circuit board; and
a slot antenna disposed on the circuit board, outside of the frame, apart from the frame, in a plane at a predetermined angle with respect to a surface of the circuit board, and electrically connected to the feeding structure,
wherein a variable antenna device is disposed in the slot antenna,
wherein the variable antenna device electrically connects a first point of the slot antenna to a second point of the slot antenna to change an antenna frequency, and
wherein the slot antenna comprises:
a slot formed inside the slot antenna,
a first antenna plate that is bent at a top end of the slot, and
a second antenna plate that is bent at a bottom end of the slot,
wherein the first antenna plate is extended in a length direction of the frame,
wherein the second antenna plate is extended in the length direction of the frame,
wherein the second antenna plate electrically connects the slot antenna to a connector provided in the frame,
wherein the slot antenna further comprises a pair of link portions formed at both ends of the first and second antenna plates, and
wherein the pair of link portions connect the first antenna plate and the second antenna plate.

19. The electronic device of claim 18,
wherein the variable antenna device comprises:
at least one lumped element arranged in parallel and electrically contacting the first point; and
a switch electrically contacting the second point, and
wherein the switch selectively contacts the at least one lumped element to generate a variable frequency according to an on or off operation.

20. The electronic device of claim 19,
wherein the at least one lumped element includes a capacitor and an inductor, and
wherein the switch is one of a single pole double throw (SPDT) switch and a single pole four throw (SP4T) switch.

21. The electronic device of claim 18,
wherein the variable antenna device comprises a variable capacitor disposed between the first and second points to establish electrical contact, and
wherein the variable capacitor is controlled by the circuit board to change a frequency according to a capacitance.

22. An electronic device comprising:
a circuit board;
a frame disposed on the circuit board, the frame being configured to surround a display of the electronic device;
a first antenna disposed on the circuit board, at one end of the frame, in a first plane at a first predetermined angle with respect to a surface of the circuit board;
a second antenna disposed on the circuit board, apart from the first antenna, and in a second plane at a second predetermined angle with respect to the surface of the circuit board;
a third antenna disposed on the circuit board, between the first antenna and the second antenna, and in a third plane at a third predetermined angle with respect to the surface of the circuit board; and
a feeding structure formed on the circuit board,
wherein one of the first antenna, the second antenna, and the third antenna, is disposed outside of the frame and spaced apart from the frame,
wherein the feeding structure electrically connects the first antenna, the second antenna, and the third antenna to the circuit board,
wherein a variable antenna device is disposed among the first antenna, the second antenna, and the third antenna,
wherein the variable antenna electrically connects one point of one of the first antenna, the second antenna, and the third antenna to another point of one of the first antenna, the second antenna, and the third antenna to change an antenna frequency,
wherein at least one of the first antenna, the second antenna, or the third antenna is a slot antenna, and
wherein the slot antenna comprises:
a slot formed inside the slot antenna,
a first antenna plate that is bent at a top end of the slot, and
a second antenna plate that is bent at a bottom end of the slot,
wherein the first antenna plate is extended in a length direction of the frame, wherein the second antenna plate is extended in the length direction of the frame, wherein the second antenna plate electrically connects the slot antenna to a connector provided in the frame, wherein the slot antenna further comprises a pair of link portions formed at both ends of the first and second antenna plates, and wherein the pair of link portions connect the first antenna plate and the second antenna plate.

* * * * *